US009548151B2

(12) United States Patent
Muller

(10) Patent No.: US 9,548,151 B2
(45) Date of Patent: Jan. 17, 2017

(54) MAGNETIC FIELD GENERATOR FOR A MAGNETOCALORIC THERMAL DEVICE, AND MAGNETOCALORIC THERMAL DEVICE EQUIPPED WITH SUCH A GENERATOR

(71) Applicant: COOLTECH APPLICATIONS S.A.S., Holtzheim (FR)

(72) Inventor: Christian Muller, Strasbourg (FR)

(73) Assignee: Cooltech Applications S.A.S., Holtzheim (FR)

(*) Notice: Subject to any disclaimer, the term of this patent is extended or adjusted under 35 U.S.C. 154(b) by 213 days.

(21) Appl. No.: 14/416,322

(22) PCT Filed: Jul. 26, 2013

(86) PCT No.: PCT/IB2013/001628
§ 371 (c)(1),
(2) Date: Jan. 22, 2015

(87) PCT Pub. No.: WO2014/016669
PCT Pub. Date: Jan. 30, 2014

(65) Prior Publication Data
US 2015/0206638 A1  Jul. 23, 2015

(30) Foreign Application Priority Data

Jul. 27, 2012  (FR) .................... 12 57323

(51) Int. Cl.
*F25B 21/00* (2006.01)
*H01F 7/02* (2006.01)
*H01F 1/01* (2006.01)

(52) U.S. Cl.
CPC ............ *H01F 7/0273* (2013.01); *F25B 21/00* (2013.01); *H01F 1/012* (2013.01); *F25B 2321/0022* (2013.01); *Y02B 30/66* (2013.01)

(58) Field of Classification Search
CPC ......... F25B 21/00; Y02B 30/66; H01F 7/0278
(Continued)

(56) References Cited

U.S. PATENT DOCUMENTS 5,010,640 A * 4/1991 Gottschalk ............ H01S 3/0903
29/602.1
5,028,903 A  7/1991 Aubert
(Continued)

FOREIGN PATENT DOCUMENTS

WO  88/02925 A1  4/1988
WO  2005/074608 A2  8/2005
WO  2012/022857 A1  2/2012

OTHER PUBLICATIONS

International Search Report Corresponding to PCT/IB2013/001628 mailed Jan. 16, 2014.
(Continued)

*Primary Examiner* — Melvin Jones
(74) *Attorney, Agent, or Firm* — Davis & Bujold PLLC; Michael J. Bujold

(57) ABSTRACT

A magnetic field generator ($G_1$) for a magnetocaloric thermal device which comprises first ($S_{M11}$) and second ($S_{M21}$) identical magnetizing structures mounted head-to-tail, on either side of a central plane (P) and defining two air gaps ($E_1$, $E_2$). Each magnetizing structure ($SM_{M11}$, $S_{M12}$) comprises first ($A_{M1}$) and second ($A_{M2}$) magnetizing assemblies, whose induction vectors are oriented in opposite directions, and mounted on a support ($S_{UP1}$). Each magnetizing assembly ($A_{M1}$, $A_{M2}$) has a permanent magnet structure ($A_{PP}$, $A_{PC}$) which comprises a passive side ($F_{P1}$, $F_{P2}$) and an active side ($F_{A1}$, $F_{A2}$), delimiting the air gaps ($E_1$, $E_2$). The induction vectors of the first ($A_{M1}$, $A_{M19}$) and the second ($A_{M2}$, $A_{M29}$) magnetizing assemblies, form inside the generator, a single
(Continued)

circulation loop of a magnetic field through the supports ($S_{UP1}$) and the air gaps ($E_1$, $E_2$, $E_3$, $E_4$).

19 Claims, 16 Drawing Sheets

(58) Field of Classification Search
 USPC .................................... 62/3.1; 335/306, 302
 See application file for complete search history.

(56) References Cited

U.S. PATENT DOCUMENTS

| | | | |
|---|---|---|---|
| 6,946,941 B2 * | 9/2005 | Chell .................... | H01F 7/0205 335/296 |
| 7,148,777 B2 * | 12/2006 | Chell ..................... | F25B 21/00 335/302 |
| 8,378,769 B2 * | 2/2013 | Heitzler ................. | F25B 21/00 335/306 |
| 2006/0077027 A1 * | 4/2006 | Aoki .................... | G01R 33/383 335/306 |
| 2012/0139676 A1 * | 6/2012 | Sari ..................... | H01F 7/0278 335/219 |

OTHER PUBLICATIONS

Written Opinion Corresponding to PCT/IB2013/001628 mailed Jan. 16, 2014.

* cited by examiner

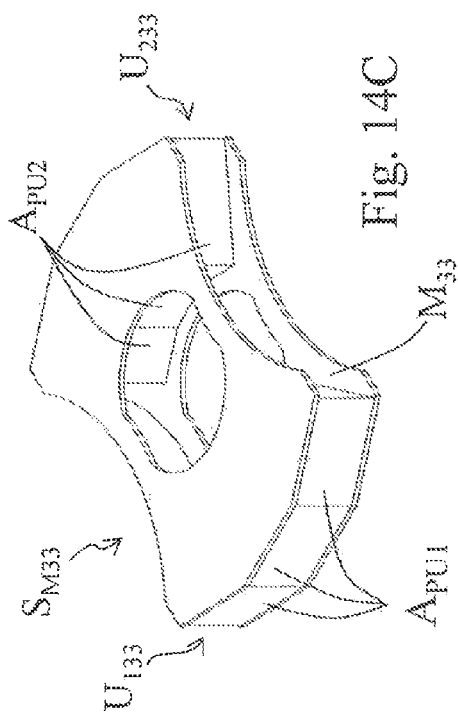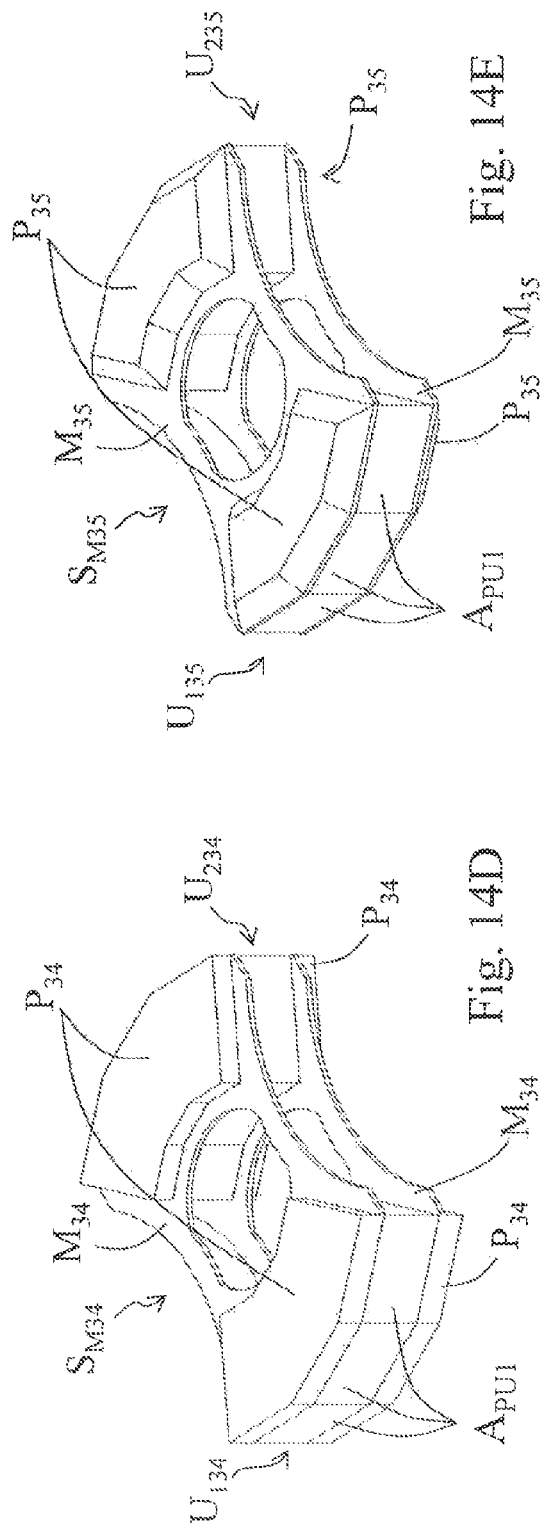

MAGNETIC FIELD GENERATOR FOR A MAGNETOCALORIC THERMAL DEVICE, AND MAGNETOCALORIC THERMAL DEVICE EQUIPPED WITH SUCH A GENERATOR

This application is a National Stage completion of PCT/IB2013/001628 filed Jul. 26, 2013, which claims priority from French patent application serial no. 12/57323 filed Jul. 27, 2012.

FIELD OF THE INVENTION

The present invention relates to a magnetic field generator for a magnetocaloric thermal device with a rotary structure, said magnetic field generator comprising a first and a second identical magnetizing structures mounted head-to-tail, opposite to each other, parallel on either side of a central plane and arranged to define at least two air gaps located in a same plane and diametrically opposed, each magnetizing structure comprising a first and a second structurally identical magnetizing assemblies, diametrically opposed, mounted on a support made out of at least one ferromagnetic material and delimiting said at least two air gaps.

It also relates to a magnetocaloric thermal device with a rotary structure, provided with at least one disk comprising magnetocaloric elements and with a magnetic field generator as defined above, said at least one disk with magnetocaloric elements being mounted in said at least two air gaps.

BACKGROUND OF THE INVENTION

Magnetic refrigeration technology at ambient temperature has been known for more than thirty years and its advantages in terms of ecology and sustainable development are widely acknowledged. Its limits in terms of its useful calorific output and its thermal performance are also well known. Consequently, all the research undertaken in this field tends to improve the performances of the magnetocaloric thermal appliances, by adjusting the various parameters, such as the intensity of the magnetic field, the performances of the magnetocaloric material, the heat exchange surface between the heat transfer fluid and the magnetocaloric materials, the performances of the heat exchangers, etc.

In these appliances, it is indispensable to generate a uniform and intense magnetic field in at least one air gap in which at least one thermal element out of magnetocaloric material enters and exits. The higher the magnetic field in the air gap, the stronger the magnetocaloric effect induced in the magnetocaloric element, which leads to an increase of the thermal output as well as of its temperature gradient and therefore of the global efficiency of such a magnetocaloric thermal appliance.

Moreover, in certain areas, the compactness of the thermal appliance is essential and leads to a rotary configuration or structure wherein the magnetic system is in relative movement with respect to the magnetocaloric material(s). Such a rotary configuration has the advantage of showing a good magnetocaloric material per used volume ratio. Since the thermal output of the thermal appliance depends in particular on the quantity of magnetocaloric material used, such arrangement is actually very advantageous.

However, there is today no magnetic field generator with a small size, a reduced cost price, that can be mounted in a rotary thermal appliance and is liable to generate an intense and uniform magnetic field concentrated to about one Tesla in at least two air gaps.

SUMMARY OF THE INVENTION

The present invention aims to meet these requirements by proposing a magnetic field generator intended to be integrated in a magnetocaloric thermal appliance. This magnetic field generator can create an intense and uniform magnetic field in at least two air gaps. Moreover, the magnetic field generator according to the invention is also easy to manufacture, easy to assemble and includes components with simple geometrical shapes and therefore with low production costs.

To that purpose, the invention relates to a magnetic field generator as described in the preamble, characterized in that the first and second magnetizing assemblies have each a structure with permanent magnets whose magnetic induction vectors are substantially perpendicular to the central plane and comprising a passive side and an active side, said active side delimiting said air gaps, and in that the induction vectors of the first and second magnetizing assemblies form inside of said generator one single circulation loop of a magnetic field through said supports and said air gaps.

In an embodiment variant of the invention, said permanent magnet structure can be a stepped structure comprising at least two stages of permanent magnets, and said stages can be concentrically superposed and comprise a first stage of permanent magnets called magnetic flux initiator stage forming said passive side of the first and second magnetizing assemblies, and a second stage of permanent magnets called magnetic flux concentrator stage forming said active side of the first and second magnetizing assemblies delimiting said air gaps.

The initiator stage is the stage in which the magnet(s) are located in a plane parallel to the central plane and support the second magnets stage called concentrator stage. In this case, the permanent magnets of the initiator stage are mounted on the support and serve as a base for the permanent magnets of the corresponding concentrator stage. In a magnetizing structure, one initiator stage allows conducting the magnetic field flux from the support towards the corresponding concentrator stage, and the other initiator stage allows conducting the magnetic field flux in the other direction, that is to say from the corresponding concentrator stage towards the support.

Thus the first and second magnetizing assemblies can comprise an active side located in the air gap and an opposed passive side. In magnetizing assemblies with two stages of permanent magnets, the initiator stage of said first and second magnetizing assemblies can be mounted on said support, the magnetic induction vector of said first magnetizing assembly can be oriented towards its active side and the magnetic induction vector of said second magnetizing assembly can be oriented towards its passive side, and the first and second magnetizing structures can be arranged so that their active sides are in front of each other.

According to the invention, in each magnetizing assembly, the cross-section of the permanent magnet stages arranged along a plane parallel to the central plane can decrease from the initiator stage towards the concentrator stage.

According to the invention, the permanent magnet stages can have different magnetic induction values. For example, the magnetic induction (e.g. 1 Tesla) of the permanent magnets forming an initiator stage can be lower than that of the permanent magnets forming the corresponding concentrator stage (e.g. 1.4 Tesla).

According to an embodiment variant, each magnetizing structure can comprise a device arranged to contain the magnetic field in the volume delimited by said generator.

Said device arranged to contain the magnetic field can comprise at least one plate made out of a ferromagnetic material, located against the corresponding lateral side of the support and extending towards the corresponding air gap.

Advantageously at least one plate of said device arranged to contain the magnetic flux can have a bent section oriented towards the corresponding air gap.

As a variant, said device arranged to contain the magnetic field flux can comprise a part out of a ferromagnetic material mounted on a support, said part extending between the first and the second magnetizing assemblies of a same magnetizing structure, in a plane parallel to the central plane, and said part comprises protruding areas extending towards the concentrator stages at the height of the inlets and/or outlets of the air gaps.

According to another embodiment variant, each support can comprise at least one permanent magnet in its central part positioned between the first and the second magnetizing assemblies of a same magnetizing structure, the magnetic induction vector of said permanent magnet being parallel to the central plane, perpendicular to the induction vectors of said first and second magnetizing assemblies and oriented in the circulation direction of said magnetic field.

In order to ensure a uniform magnetic loop in the magnetic field generator, the central section of every support located between the first and the second magnetizing assemblies of a same magnetizing structure can be made out of a ferromagnetic material having a magnetic permeability that is higher than that of the material forming the rest of the support.

According to an embodiment variant, a flat thermal insulation part parallel to the central plane can be mounted on every magnetizing structure and placed on the corresponding concentrator stages.

The thermal insulation part can be a disk comprising recesses for the passage of the permanent magnets of the concentrator stage and can rest on the landing formed by the magnet stage on which the concentrator stage is mounted.

In another embodiment variant, the generator can comprise a third magnetizing structure inserted in the central plane, between the first and the second magnetizing structures, said third magnetizing structure comprising two magnetizing units located respectively between the first and the second magnetizing assemblies of said first and second magnetizing structures, to delimit four air gaps.

Each magnetizing unit can comprise at least one permanent magnet whose magnetic induction vector has the same orientation and direction as the magnetic induction vector of the magnetizing assemblies between which said magnetizing unit is positioned.

The above described permanent magnets used to realize the magnetic field generator according to this invention have preferably a uniform magnetization.

In the third magnetizing structure, the magnetizing units can comprise permanent magnets arranged or mounted on either side of a supporting element made out of a ferromagnetic material. As a variant, the permanent magnets of the third magnetizing structure can be arranged or mounted between two identical supporting elements parallel with each other and made out of a ferromagnetic material.

The supporting element has preferably the shape of a plate.

The invention also relates to a magnetocaloric thermal device as described in the preamble, characterized in that it comprises at least one magnetic field generator as defined above and in that said disk carrying said magnetocaloric elements is mounted in the air gaps of said magnetic field generator.

The magnetocaloric elements liable to be positioned in the air gaps of the magnetic field generator according to the invention are intended to be in thermal contact with a heat transfer fluid. This heat transfer fluid can for example circulate from their cold end towards their hot end during a first phase of the magnetic cycle, which corresponds to a phase during which the magnetocaloric elements are positioned in an air gap and are subjected to a magnetic field leading to an increase of their temperature, and from their hot end towards their cold end during a second phase of the magnetic cycle, during which the magnetocaloric elements are positioned outside the air gap and are subjected to a zero magnetic field leading to a decrease of their temperature The thermal contact between the heat transfer fluid and the magnetocaloric elements can be achieved with a heat transfer fluid passing along or through the magnetocaloric elements. To that purpose, the magnetocaloric elements can be made of one or several magnetocaloric materials and can be permeable to the heat transfer fluid. They can also include circulation paths for the fluid extending between the two ends of the magnetocaloric elements. These paths can be achieved by the porosity of the magnetocaloric materials or by channels obtained for example using a set of plates out of magnetocaloric material.

The heat transfer fluid is preferably a liquid. To that purpose, it is possible for example to use pure water or water with antifreeze, a glycolated product or a brine.

According to the invention, the magnetic field generator of said magnetocaloric thermal device can comprise a third magnetizing structure inserted in the central plane, between the first and the second magnetizing structures, said third magnetizing structure comprising two magnetizing units located respectively between the first and the second magnetizing assemblies of said first and second magnetizing structures, to delimit four air gaps.

BRIEF DESCRIPTION OF THE DRAWINGS

The present invention and its advantages will be better revealed in the following description of embodiments given as non limiting examples, in reference to the drawings in appendix, in which.

DETAILED DESCRIPTION OF THE PREFERRED EMBODIMENTS

In the illustrated embodiment examples, the identical pieces or parts have the same numerical references.

Figure 1:
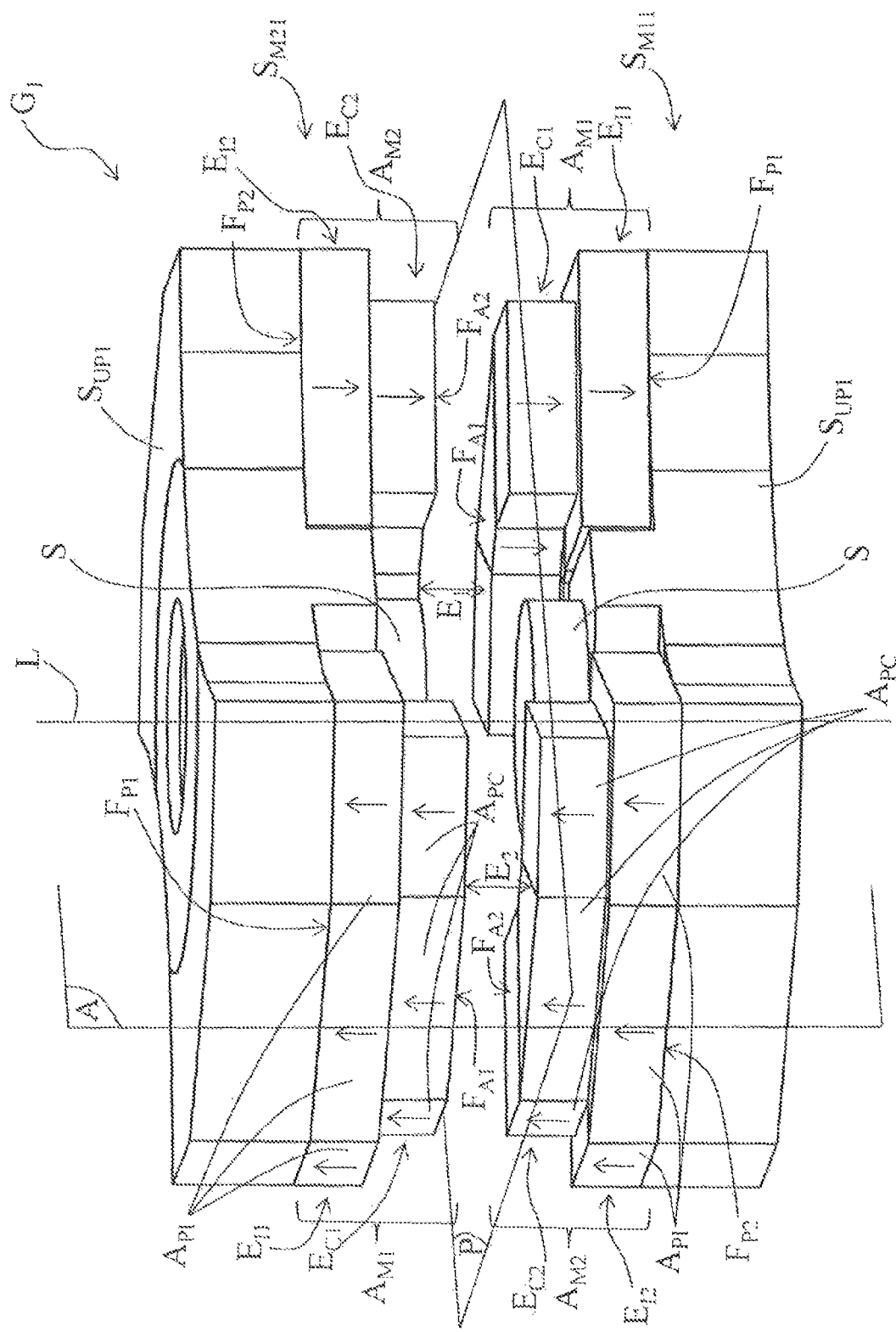
FIG. 1 is a perspective view of a magnetic field generator according to the invention.
Figure 2:
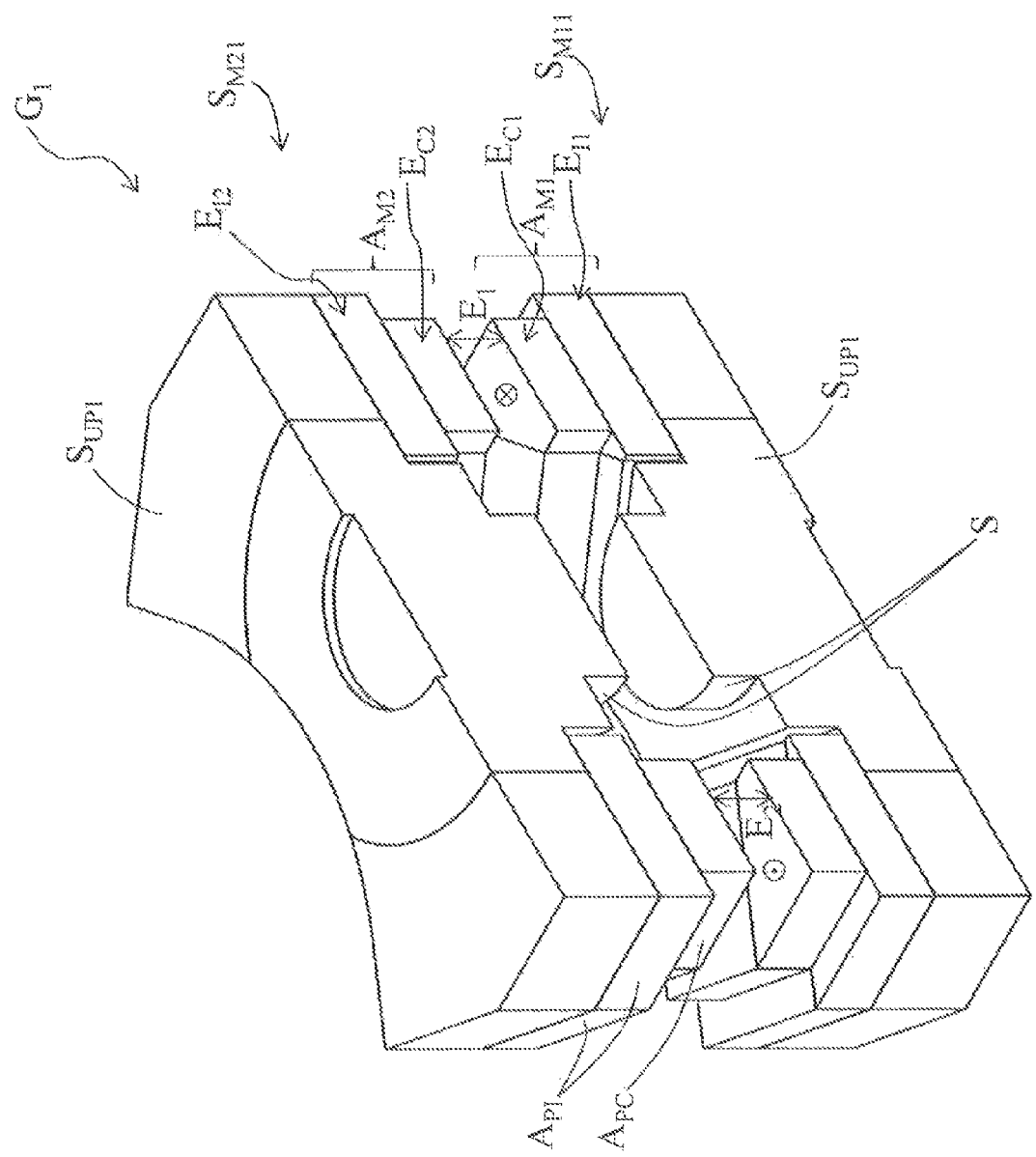
FIG. 2 is a cross-sectional view along plane A of FIG. 1.

FIGS. 1 and 2 represent a first embodiment of a magnetic field generator $G_1$ according to the invention. This magnetic field generator $G_1$ comprises a first magnetizing structure $S_{M11}$ and a second magnetizing structure $S_{M21}$ which are identical, mounted head-to-tail and arranged opposite to each other parallel to a central plane P. They delimit between them two air gaps $E_1$, $E_2$, diametrically opposed with respect to the longitudinal axis L of the magnetic field generator $G_1$. Each magnetizing structure $S_{M11}$, $S_{M21}$ comprises a first magnetizing assembly $A_{M1}$ and a second magnetizing assembly $A_{M2}$. The two magnetizing structures $S_{M11}$, $S_{M21}$ are located with respect to each other so that the first magnetizing assembly $A_{M1}$ of the first magnetizing structure $S_{M11}$ is located in front of the second magnetizing assembly $A_{M2}$ of the second magnetizing structure $S_{M21}$ and that the second magnetizing assembly $A_{M2}$ of the first magnetizing structure $S_{M11}$ is located in front of the first magnetizing assembly $A_{M1}$ of the second magnetizing structure $S_{M21}$ to generate in the air gaps $E_1$, $E_2$, parallel induction vectors, oriented towards opposite directions.

Figure 13:
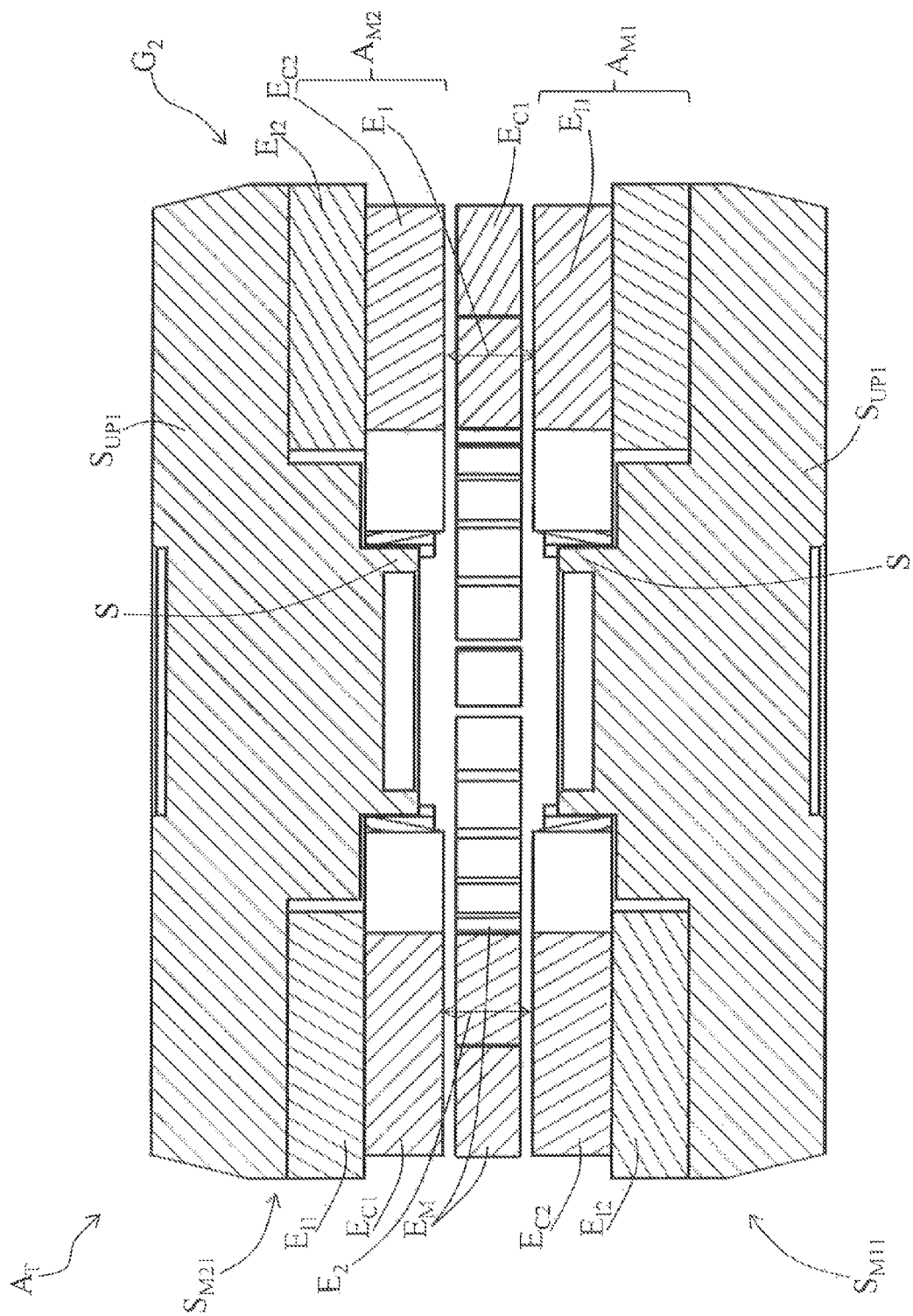
FIG. 13 is a simplified schematic view of a magnetocaloric thermal device comprising a magnetic field generator according to the invention as that of FIG. 3, FIGS. 14A to 14E are different embodiment variants of a third magnetizing structure.

The magnetizing assemblies $A_{M1}$ and $A_{M2}$ of each magnetizing structure $S_{M11}$, $S_{M21}$ are mounted diametrically opposite with respect to the longitudinal axis L on a support $S_{UP1}$ made out of a ferromagnetic material such as steel, iron-based alloy or iron. This support $S_{UP1}$ a serves to maintain the first $A_{M1}$ and second $A_{M2}$ magnetizing assemblies in position and conduct the magnetic flux lines exiting the first magnetizing assembly $A_{M1}$ towards the second magnetizing assembly $A_{M2}$. To that purpose, as represented as an example in FIG. 1, the support $S_{UP1}$ can comprise a protruding section S that extends towards the opposite magnetizing structure $S_{M11}$, $S_{M21}$, around the longitudinal axis L, between the first and second magnetizing assemblies $A_{M1}$, $A_{M2}$. This protruding section S allows ensuring a homogeneous circulation of the magnetic flux between the first $A_{M1}$ and second $A_{M2}$ magnetizing assemblies while avoiding magnetic flux saturation in the support $S_{UP1}$, without affecting the size of the generator $G_1$. In the generator $G_1$ represented in FIG. 1, this protruding section S also allows centering the generator $G_1$ with respect to a part of a magnetocaloric thermal device $A_T$ comprising magnetocaloric elements $E_M$ and positioned between the two magnetizing structures $S_{M12}$, $S_{M21}$ as shown in FIG. 13. The support $S_{UP1}$ can also have a different configuration and be made of an assembly of several plates out of a ferromagnetic material forming a support with a so-called sandwich structure, which has lower manufacturing costs. This configuration can be implemented in all supports $S_{UP1}$, $S_{UP2}$, $S_{UP3}$, $S_{UP4}$, $S_{UP9}$ described.

The fact that the two magnetizing structures $S_{M11}$, $S_{M21}$ that form the magnetic field generator $G_1$ are identical meets the requirements for an optimization of the production costs for the manufacture of said generator $G_1$ according to the invention. This actually allows reducing the number of parts necessary for its manufacture, thus facilitating its assembly, the referencing of the parts and the management of the inventory.

In addition to an easy and cost-effective production, the magnetizing assemblies $A_{M1}$, $A_{M19}$ and $A_{M21}$, $A_{M29}$ of the generator according to the invention have a stepped structure that allows optimizing the magnetic induction in the corresponding air gaps. In the embodiment example shown in FIG. 1, each magnetizing assembly $A_{M1}$ and $A_{M2}$ comprises two stages $E_{I1}$, $E_{C1}$, $E_{I2}$, $E_{C2}$ of permanent magnets $A_{PI}$, $A_{PC}$. These stages $E_{I1}$, $E_{C1}$, $E_{I2}$, $E_{C2}$ are superposed and positioned in a centered way with respect to each other, A first stage called magnetic field initiator stage $E_{I1}$, $E_{I2}$ is mounted on the support $S_{UP1}$ and a second stage called magnetic field concentrator stage $E_{C1}$, $E_{C2}$ is mounted centered on the initiator stage $E_{I1}$, $E_{I2}$. The task of this concentrator stage $E_{C1}$, $E_{C2}$ is to concentrate, intensify and direct the magnetic field from the initiator stage $E_{I1}$, $E_{I2}$ to or from the corresponding air gap $E_1$, $E_2$. In a magnetizing structure, one initiator stage allows conducting the magnetic field flux from the support towards the corresponding concentrator stage, and the other initiator stage allows conducting the magnetic field flux in the other direction, that is to say from the corresponding concentrator stage towards the support. Thanks to the stepped shape of the first $A_{M1}$ and second $A_{M2}$ magnetizing assemblies, the magnetic field flux is concentrated and intensified in the air gaps $E_1$, $E_2$.

In other words, the stages $E_{I1}$, $E_{I2}$, $E_{C1}$, $E_{C2}$ are mounted on each other in order to form a structure with landings and whose cross-section along a plane parallel to plane P decreases towards the corresponding air gap $E_{I1}$, $E_2$, in the way of a nested structure. To that purpose, the initiator stage $E_{I1}$, $E_{I2}$ comprises a cross-section along a plane parallel to plane P that is larger than that of the concentrator stage $E_{C1}$, $E_{C2}$.

Figure 15:
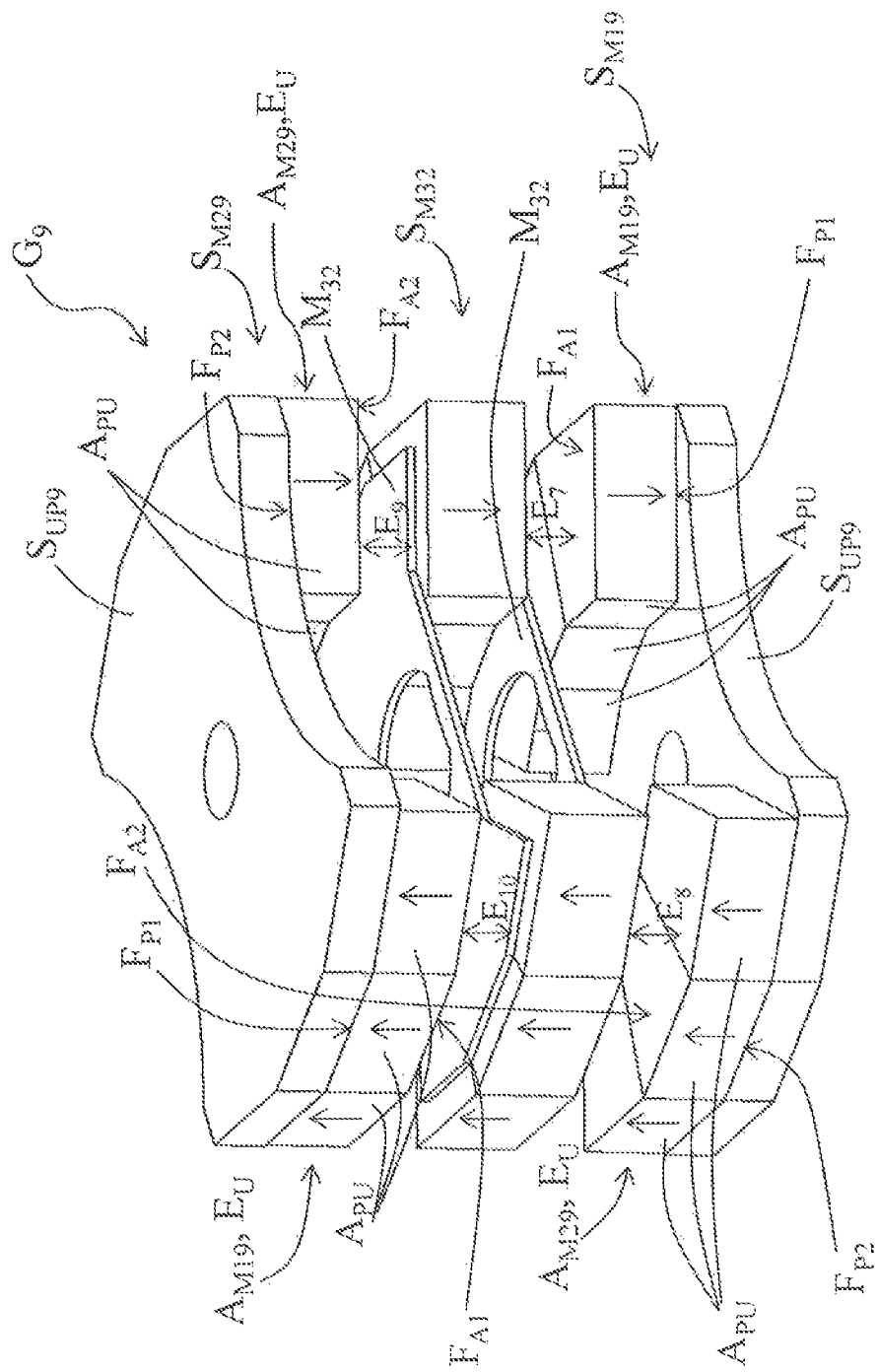
FIG. 15 is a view of another embodiment variant of the magnetic field generator according to the invention.

As a variant of this stepped structure and according to FIG. 15, the permanent magnets $A_{PU}$ that form the first $S_{M19}$ and second $S_{M29}$ magnetizing structures can form one single stage $E_U$ of permanent magnets positioned on the corresponding support $S_{UP9}$. Such a configuration has the advantages that it can be assembled more rapidly and therefore at lower cost.

The permanent magnets $A_{PI}$, $A_{PC}$, $A_{PU}$ of the stages $E_{I1}$, $E_{I2}$, $E_{C1}$, $E_U$ are preferably uniformly magnetized and their induction vector is perpendicular to the plane P. The magnetizing assemblies $A_{M1}$, $A_{M19}$ and $A_{M2}$, $A_{M29}$ comprise an active side $F_{A1}$, $F_{A2}$ located in the air gap $E_1$, $E_2$, $E_3$, $E_4$, $E_5$, $E_6$, $E_7$, $E_8$, $E_9$, $E_{10}$ and a passive side $F_{P1}$, $F_{P2}$ located outside the air gap $E_1$, $E_2$, $E_3$, $E_4$, $E_5$, $E_6$, $E_7$, $E_8$, $E_9$, $E_{10}$. These active $F_{A1}$, $F_{A2}$ and passive $F_{P1}$, $F_{P2}$ sides are parallel with each other and with the central plane P. The passive side $F_{P1}$, $F_{P2}$ of a magnetizing assembly $A_{M1}$, $A_{M19}$, $A_{M2}$, $A_{M29}$ corresponds to the side of the magnets $A_{PI}$ or $A_{PU}$, of the initiator stage $E_{I1}$, $E_{I2}$ or of the single stage $E_U$ that is in contact with the support $S_{UP1}$, $S_{UP9}$ and its active side $F_{A1}$, $F_{A2}$ corresponds to the side of the magnets $A_{PC}$ or $A_{PU}$ of the concentrator stage $E_{C1}$, $E_{C2}$ or of the single stage $E_U$ that delimits the air gap $E_1$, $E_2$.

In the examples illustrated in FIGS. 1 to 12, the magnetizing structures $S_{M11}$, $S_{M12}$, $S_{M13}$, $S_{14}$, $S_{M15}$, $S_{M21}$, $S_{M22}$ comprise two stages $E_{I1}$, $E_{I2}$, $E_{C1}$, $E_{C2}$ of permanent magnets $A_{PI}$, $A_{PC}$ and each stage $E_{I1}$, $E_{I2}$, $E_{C1}$, $E_{C2}$ comprises three permanent magnets $A_{PI}$, $A_{PC}$. The invention however is not restricted to this configuration. The stages $E_{I1}$, $E_{I2}$, $E_{C1}$, $E_{C2}$ can in effect comprise a different number of permanent magnets $A_{PI}$, $A_{PC}$ and can comprise only one or several of them. In the same way, a magnetizing structure $S_{M11}$, $S_{M12}$, $S_{M13}$, $S_{M14}$, $S_{M15}$, $S_{M21}$, $S_{M22}$ can be made of more than two stages $E_{I1}$, $E_{I2}$, $E_{C1}$, $E_{C2}$ or one single stage $E_U$ can be provided to form a magnetizing structure, as is the case in the generator example represented in FIG. 15. Likewise, the shape of the stages $E_{I1}$, $E_{I2}$, $E_{C1}$, $E_{C2}$, $E_U$, here with quadrangular cross-sections, and that of the permanent magnets $A_{PI}$, $A_{PC}$, $A_{PU}$ forming them can be different of the represented ones and can be adapted to the shape and volume of the air gaps $E_1$, $E_2$, $E_3$, $E_4$, $E_5$, $E_6$, $E_7$, $E_8$, $E_9$, $E_{10}$ imposed by the shape of the magnetocaloric elements $E_M$ to be subjected to the magnetic field inside the air gaps $E_1$, $E_2$, $E_3$, $E_4$, $E_5$, $E_6$, $E_7$, $E_8$, $E_9$, $E_{10}$ as well as to the intensity of this magnetic field.

Within a same magnetizing structure $S_{M11}$, $S_{M12}$, $S_{M13}$, $S_{M14}$, $S_{M15}$, $S_{21}$, $S_{M22}$, the induction vectors of the permanent magnets $A_{PI}$, $A_{PC}$, $A_{PU}$ of the stages $E_{I1}$, $E_{I2}$, $E_{C1}$, $E_{C2}$, $E_U$ have the same orientation. However, to achieve an intense magnetic circulation in the generator $G_1$ along a single magnetic loop including the air gaps $E_1$, $E_2$, the orientation of the induction vectors in the magnetizing assemblies $A_{M1}$, $A_{M2}$ of a same magnetizing structure $S_{M11}$, $S_{M12}$, $S_{M13}$, $S_{M14}$, $S_{M15}$, $S_{M21}$, $S_{M22}$, is reversed, so that the orientation of the magnetic induction flux in the air gaps $E_1$, $E_2$ is also reversed. The same applies to the magnetic orientation of the magnetizing assemblies $A_{M19}$, $A_{M29}$ in each magnetizing structure $S_{M19}$, $S_{M29}$ of the generator $G_9$ of FIG. 15.

To that purpose, considering the first magnetizing structure $S_{M11}$ of the generator $G_1$ of FIG. 1, represented in the lower section of the drawing, the magnets $A_{PC}$ of the first magnetizing assembly $A_{M1}$ have an active side $F_{A41}$, on the side of the air gap $E_1$ located in front of the central plane P in which the magnetic induction flux enters. The same way, the magnets $A_{PC}$ of the second magnetizing assembly $A_{M2}$ have an active side $F_{A2}$, on the side of the air gap $E_2$ located in front of the central plane P from which the magnetic induction flux exits. In addition, the active sides $F_{A1}$ and $F_{A2}$ are located in a same plane. The induction vector of the permanent magnets $A_{PI}$, $A_{PC}$ of the second magnetizing assembly $A_{M2}$ is oriented towards the plane P, while the induction vector of the permanent magnets $A_{PI}$, $A_{PC}$ of the first magnetizing assembly $A_{M1}$ is oriented in the opposite direction, moving away from the central plane P, both vectors being perpendicular to the central plane P.

The second magnetizing structure $S_{M21}$ (illustrated in the upper section of FIG. 1) is identical to the first magnetizing structure $S_{M11}$. It is arranged with respect to the plane P so that the active sides $F_{A1}$ and $F_{A2}$ of the first and second magnetizing assemblies $A_{M1}$, $A_{M2}$ are parallel to the plane P and located in front of the active sides $F_{A2}$ et $F_{A1}$ of the second and first magnetizing assemblies $A_{M2}$, $A_{M1}$ of the first magnetizing structure $S_{M11}$. Moreover, the first magnetizing assembly $A_{M1}$ of the first magnetizing structure $S_{M11}$ is located in front of the second magnetizing assembly $A_{M2}$ of the second magnetizing structure $S_{M21}$ while the second magnetizing assembly $A_{M2}$ of the first magnetizing structure $S_{M11}$ is located in front of the first magnetizing assembly $A_{M1}$ of the second magnetizing structure $S_{M21}$. This way, the permanent magnets $A_{PC}$ of the concentrator stages $E_{C1}$, $E_{C2}$ located in front of each other have induction vectors with the same direction and orientation and delimit two air gaps $E_1$, $E_2$. A first air gap $E_1$ is located on the right of FIG. 1 and is represented by the free volume between the first magnetizing assembly $A_{M\,1}$ of the first magnetizing structure $S_{M11}$ and the second magnetizing assembly $A_{M2}$ of the second magnetizing structure $S_{M21}$ and the magnetic flux lines are oriented from the second magnetizing structure $S_{M21}$ towards the first magnetizing structure $S_{M11}$ (towards the lower section of FIG. 1). A second air gap $E_2$ is located on the left of FIG. 1 and is represented by the free volume between the second magnetizing assembly $A_{M2}$ of the first magnetizing structure $S_{M11}$ and the first magnetizing assembly $A_{M1}$ of the second magnetizing structure $S_{M21}$ and the magnetic flux lines are oriented from the first magnetizing structure $S_{M11}$ towards the second magnetizing structure $S_{M21}$ (towards the upper section of FIG. 1). The magnetic field generator G1 generates one single magnetic loop that circulates, between the first and second magnetizing structures $S_{M11}$, $S_{M21}$, only through the air gaps $E_1$, $E_2$ in which the magnetic field is concentrated. In other words, outside the first $SM_{11}$ and second $SM_{12}$ magnetizing structures, the magnetic flux circulates only through the air gaps $E_1$, $E_2$. This is the case in all variants of the magnetic field generator $G_1$, $G_2$, $G_3$, $G_4$, $G_5$, $G_6$, $G_7$, $G_8$ according to the invention referring to FIGS. 1 to 12. In other words, this generator $G_1$, $G_2$, $G_3$, $G_4$, $G_5$, $G_6$, $G_7$, $G_8$ thus comprises no magnetic link created using a magnetizable or magnetized material between the magnetizing structures $S_{M11}$, $S_{M12}$, $S_{M13}$, $S_{M14}$, $S_{M15}$, $S_{M21}$, $S_{M22}$, $S_{M3}$.

The magnetic field generator $G_1$, represented in FIG. 1 can be mounted in or carried by a housing or a support made out of a ferromagnetic material serving as a magnetic shielding to prevent the magnetic field lines from exiting the volume delimited by the generator $G_1$. The same applies to the other generators according to the invention.

Figure 3:
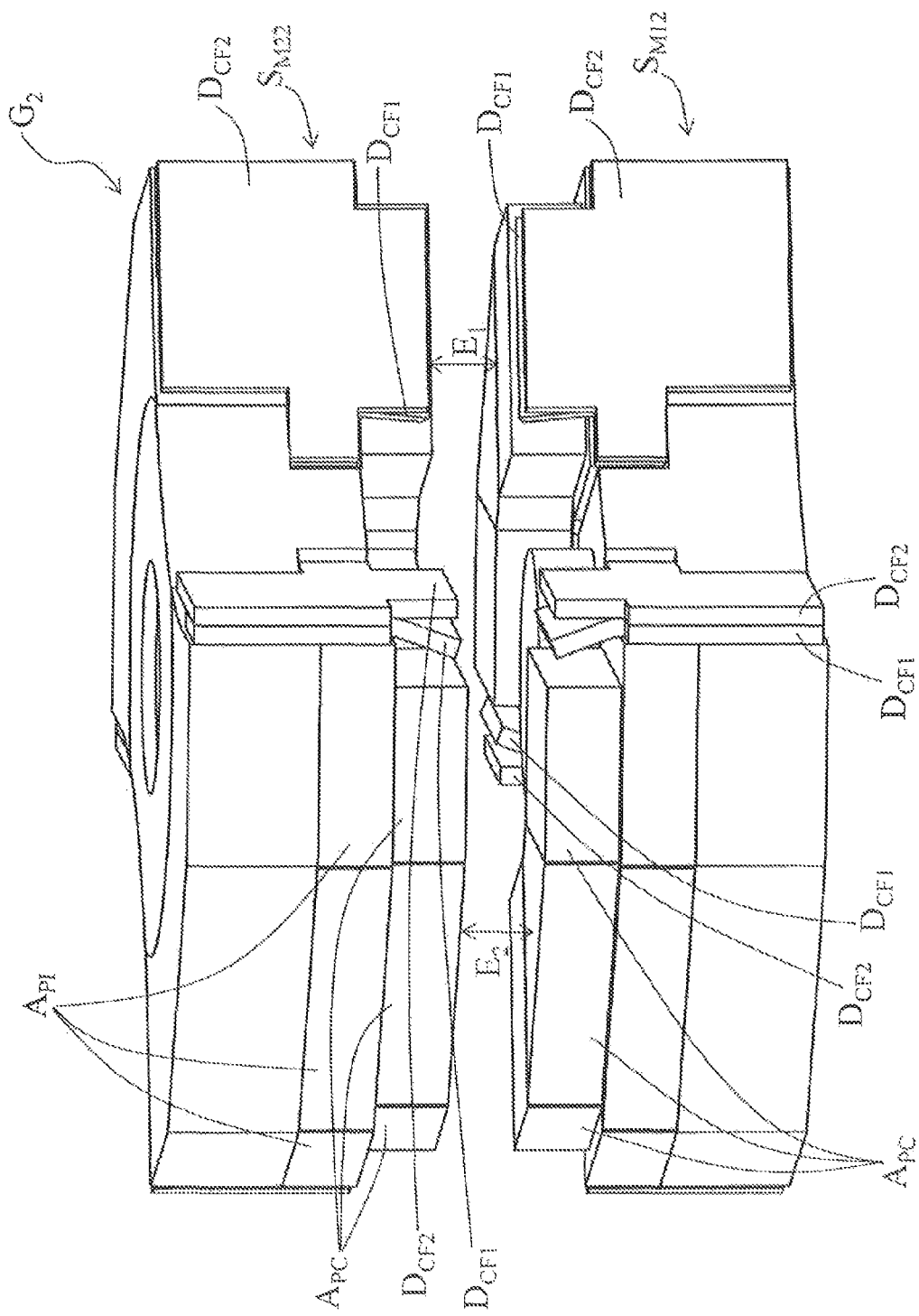
FIG. 3 is a perspective view of the generator of FIG. 1 provided with a device able to contain the magnetic field flux.
Figure 4:
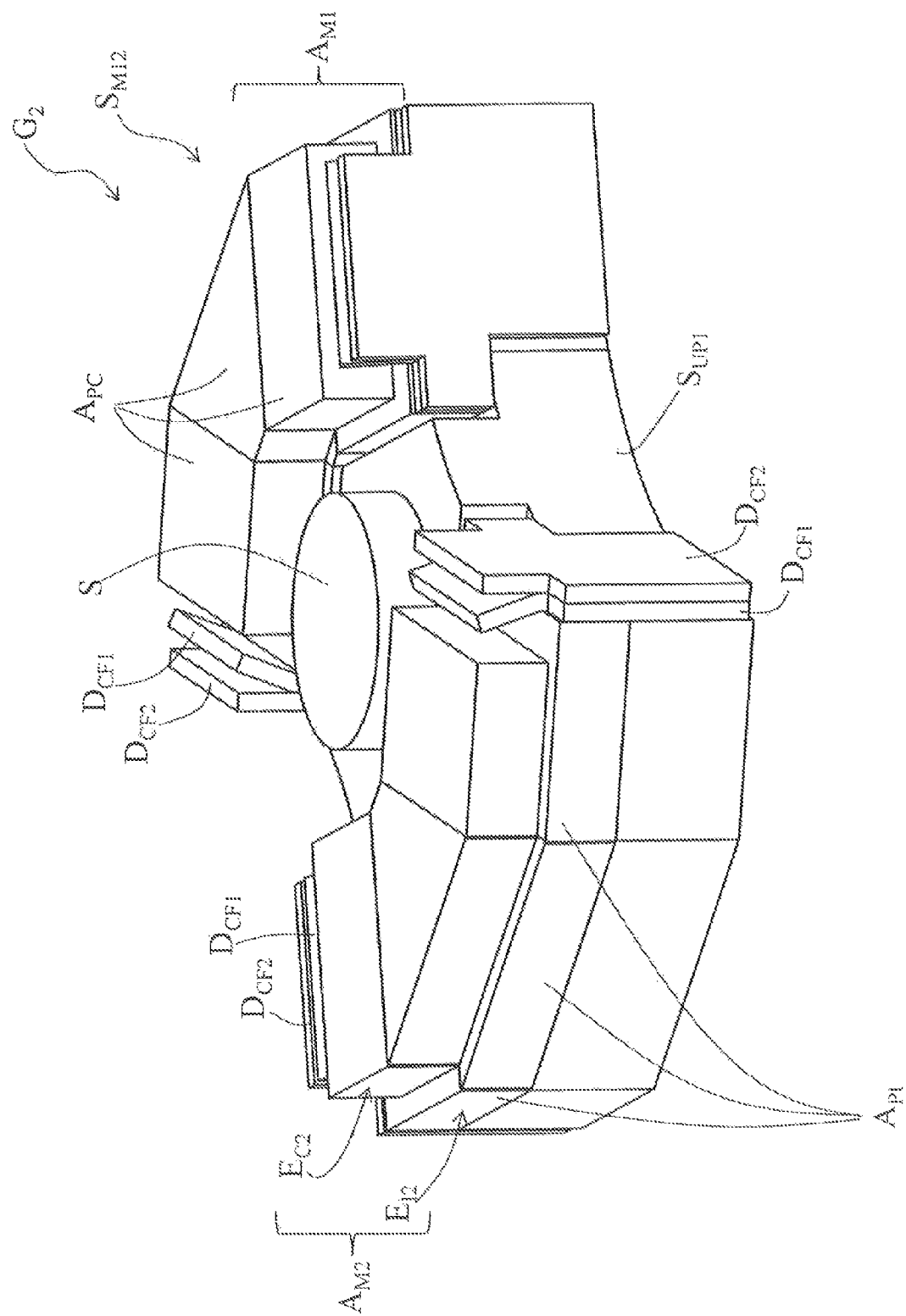
FIG. 4 is a perspective view of a magnetizing structure of the generator of FIG. 3.

FIGS. 3 and 4 represent an embodiment variant in which each magnetizing structure $S_{M12}$, $S_{M22}$ of the generator $G_2$ comprises a device $D_{CF1}$, $D_{CF2}$ arranged to contain the magnetic field flux within the volume delimited by said generator $G_2$. This device is made of plates $D_{CF1}$, $D_{CF2}$ out of a ferromagnetic material such as a steel or iron and whose task is to canalize the magnetic field in the zone where the magnets $A_{PI}$, $A_{PC}$ are located in order to achieve an intense magnetic field in the air gaps $E_1$, $E_2$ and a zero magnetic field outside. This way, the most sudden magnetic induction variation possible is achieved between a position located inside the air gap and a position located outside the corresponding air gap $E_1$, $E_2$.

These plates $D_{CF1}$, $D_{CF2}$ are mounted against the lateral sides of the initiator stages $E_{I1}$, $E_{I2}$, that is to say the sides located at the entry and at the exit of the air gaps $E_1$, $E_2$, for the magnetocaloric elements $E_M$ and against the lateral sides of the support $S_{UP1}$. The inside plate $D_{CF1}$ has a section bent towards the air gap $E_1$, $E_2$ that allows directing the flux lines towards the volume of the generator $G_2$, and more specifically towards the corresponding air gap $E_1$, $E_2$. These plates can also be provided in the embodiment variant illustrated in FIG. 15 with one single stage of magnets.

Figure 5:
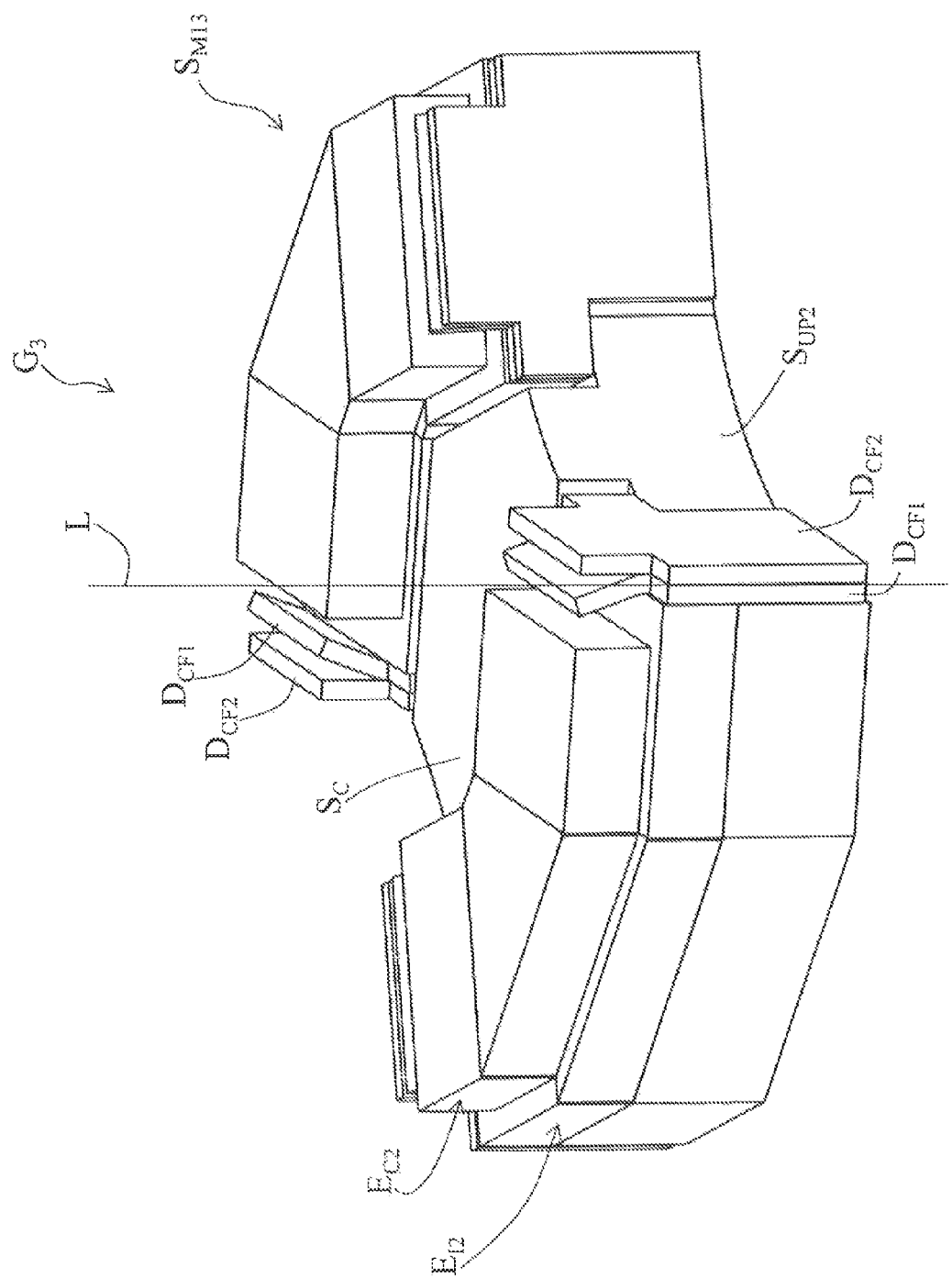
FIG. 5 is an embodiment variant of the magnetizing structure of FIG. 4.

FIG. 5 represents an embodiment variant in which the illustrated magnetic field generator $G_3$ differs from that of FIGS. 3 and 4 only by the shape of the support $S_{UP2}$ of a magnetizing structure $S_{M13}$ whose central section has no protruding area. To that purpose, in order to prevent magnetic saturation in said support $S_{UP2}$, the latter can comprise sections such as the central area Sc around the longitudinal axis L with a magnetic permeability that is higher than that of the other sections, using for example an iron and cobalt alloy to make this central area Sc and only iron for the rest of the support $S_{UP2}$.

Figure 6:
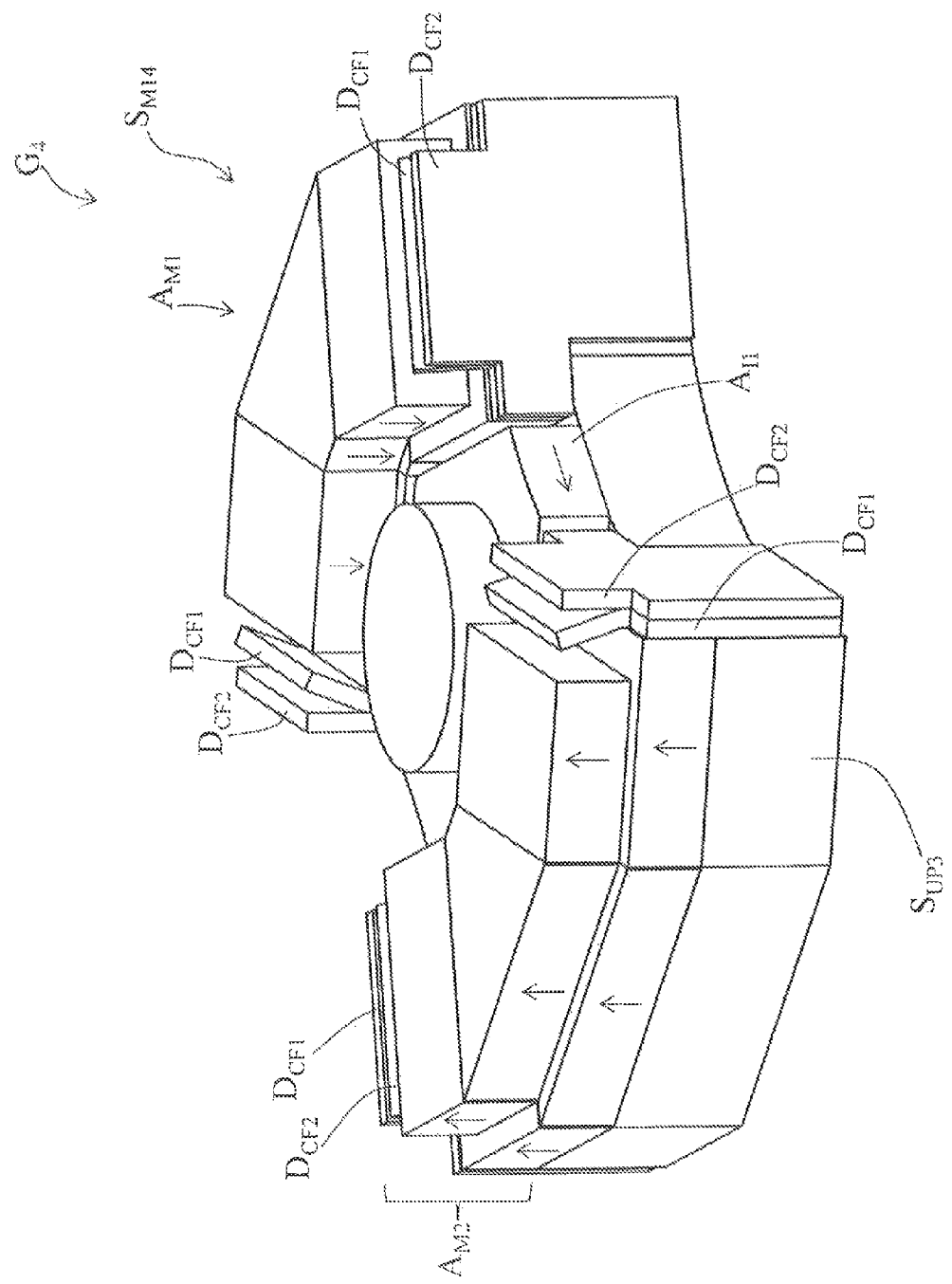
FIG. 6 is a view identical that of FIG. 4, according to a further embodiment variant.

FIG. 6 represents an embodiment variant in which the magnetic field generator $G_4$ also differs from that of FIGS. 3 and 4 by its support $S_{UP3}$, which comprises a permanent magnet $A_{f1}$ that promotes the circulation of the magnetic flux between the first $A_{M1}$ and second $A_{M2}$ magnetizing assemblies of a magnetizing structure $S_{M14}$. To that purpose, this permanent magnet $A_{f1}$ is uniformly magnetized and its magnetic induction vector is parallel to the plane P, perpendicular to the induction vector of said first $A_{M1}$ and second $A_{M2}$ magnetizing assemblies and oriented from the first magnetizing assembly $A_{M1}$ towards the second magnetizing assembly $A_{M2}$ in the circulation direction of the magnetic field. As a variant, said support $S_{UP3}$ can comprise, at least in part, ferrite, for example at the level of the parts that support the first $A_{M1}$ and second $A_{M2}$ magnetizing assemblies.

Figure 7:
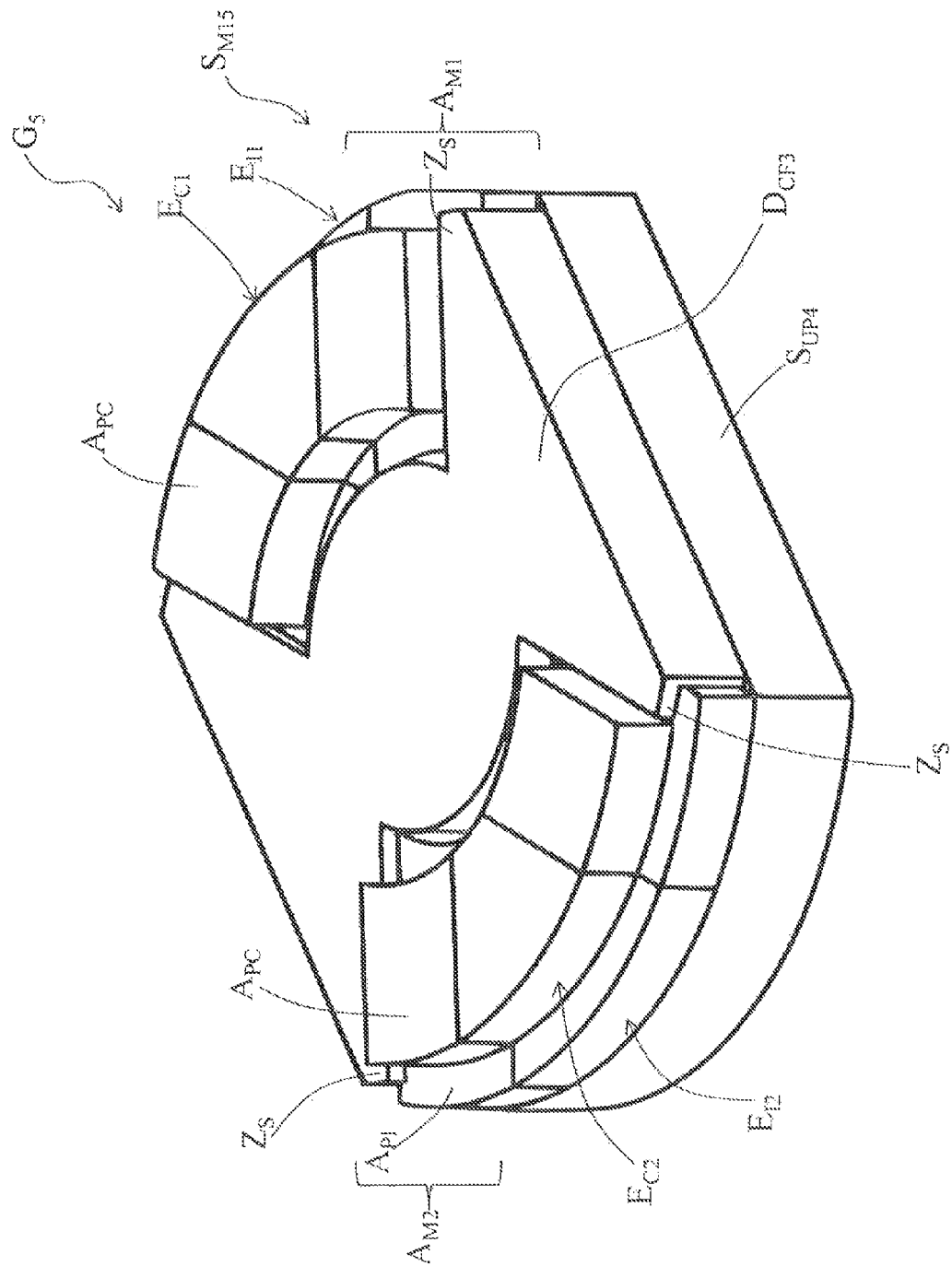
FIG. 7 is a perspective view of another embodiment variant of a magnetizing structure.

FIG. 7 represents an embodiment variant in which the magnetic field generator $G_5$ comprises a device $D_{CF3}$ arranged to contain the magnetic field flux in the volume defined by said generator $G_5$, this device $D_{CF3}$ being a variant of the equivalent device $D_{CF1}$, $D_{CF2}$ of FIGS. 3 and 4. This device $D_{CF3}$ comprises a part out of a ferromagnetic material mounted on the support $S_{UP4}$ of a magnetizing structure $S_{M15}$. To that purpose, the support $S_{UP4}$ has the shape of a plate parallel to the central plane P, with rounded ends, on which the first $A_{M1}$ and second $A_{M2}$ magnetizing assemblies are mounted on either side. The part $D_{CF3}$ has the shape of a plate that extends substantially on the rest of the surface of the support $S_{UP4}$ and shows, near to the entries and exits of the air gaps $E_1$, $E_2$, protruding areas $Z_S$ that extend towards the concentrator stages $E_{C1}$, $E_{C2}$. The task of this part $D_{CF3}$ is to canalize the magnetic field in the area where the magnets $A_{PI}$, $A_{PC}$ are located and to ensure a good magnetic flux circulation, in order to achieve the most intense magnetic field possible in the air gaps $E_1$, $E_2$ and also the highest magnetic intensity difference possible between a position inside the air gap $E_1$, $E_2$ and a position outside the air gap $E_1$, $E_2$.

Figure 8:
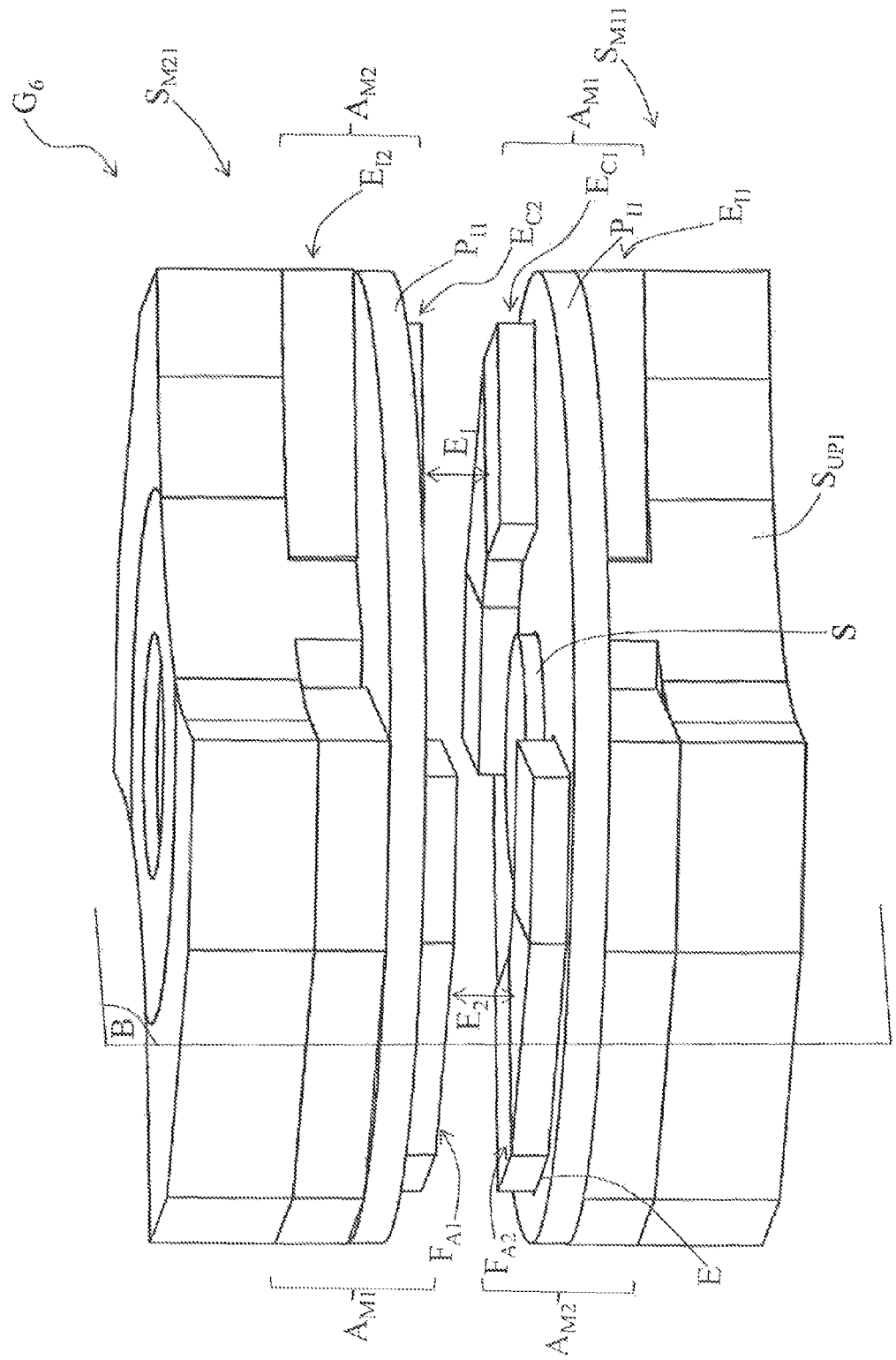
FIG. 8 is a perspective view of a variant of the magnetic field generator of FIG. 1.
Figure 9:
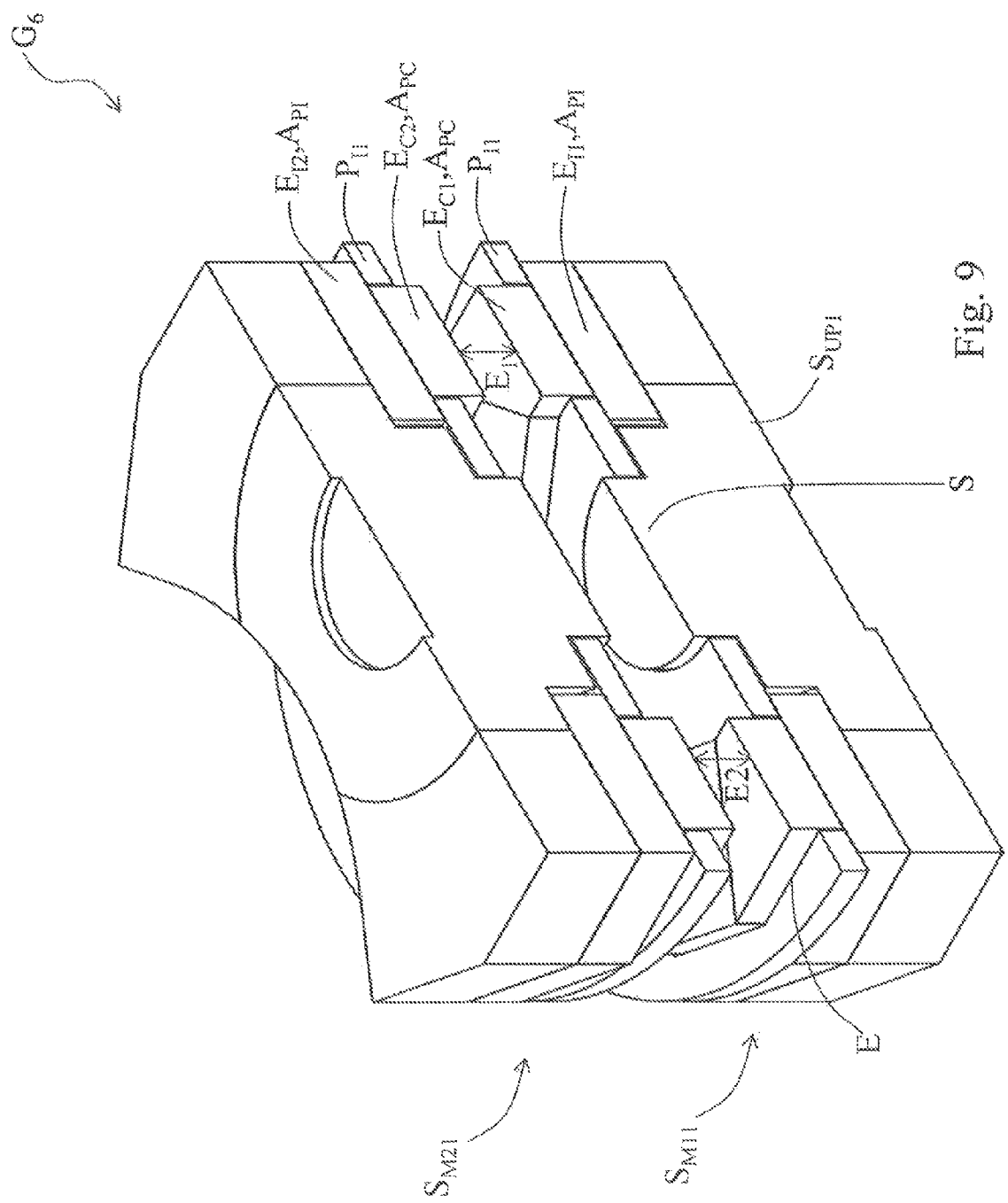
FIG. 9 is a cross-sectional view along plane B of the generator of FIG. 8.

FIGS. 8 and 9 represent an embodiment variant in which the magnetic field generator $G_6$ differs from that of FIGS. 1 and 2 by the presence of a thermal and/or sound insulation element $P_{I1}$ in the form of a disk placed on the concentrator stages $E_{C1}$, $E_{C2}$ of the first $A_{M1}$ and second $A_{M2}$ magnetizing assemblies of the first $S_{M11}$ and second $S_{M21}$ magnetizing structures. This disk $P_{I1}$ is even, parallel to the plane P and made out of a material having a very low thermal conductivity coefficient, such as a plastic for example. In the illustrated example, the first $A_{M1}$ and second $A_{M2}$ magnetizing assemblies comprise two stages $E_{I1}$, $E_{I2}$, $E_{C1}$, $E_{C2}$ of permanent magnets $A_{PI}$, $A_{PC}$, so that the disk $P_{I1}$ rests on the initiator stage $E_{I1}$, $E_{I2}$. Moreover, the disk $P_{I1}$ comprises recesses E with a shape complementary to the concentrator stages $E_{C1}$, $E_{C2}$ that allow placing it over the latter. This disk $P_{I1}$ allows insulating thermally the air gaps $E_1$, $E_2$ from the external environment and avoiding in said air gaps $E_1$, $E_2$ the ventilation effect due to the rotation of the generator $G_6$. This way, the thermal influence of the external environment on the magnetocaloric elements that are placed in the air gaps $E_1$, $E_2$ is limited, or even nonexistent.

In a not represented variant, the side of the disk $P_{I1}$ located in the air gap $E_1$, $E_2$ can be at the same level as the active sides $F_{A1}$, $F_{A2}$ of the first $A_{M1}$ and second $A_{M2}$ magnetizing assemblies on which said disk $P_{I1}$ positioned. In other words, the thermal and/or sound insulation disk $P_{I1}$ can have substantially the same height (along the longitudinal axis L) as the corresponding concentrator stage $E_{C1}$, $E_{C2}$. This variant allows reducing further the stirring of the air in the air gaps and ensuring improved thermal insulation.

Figure 10:
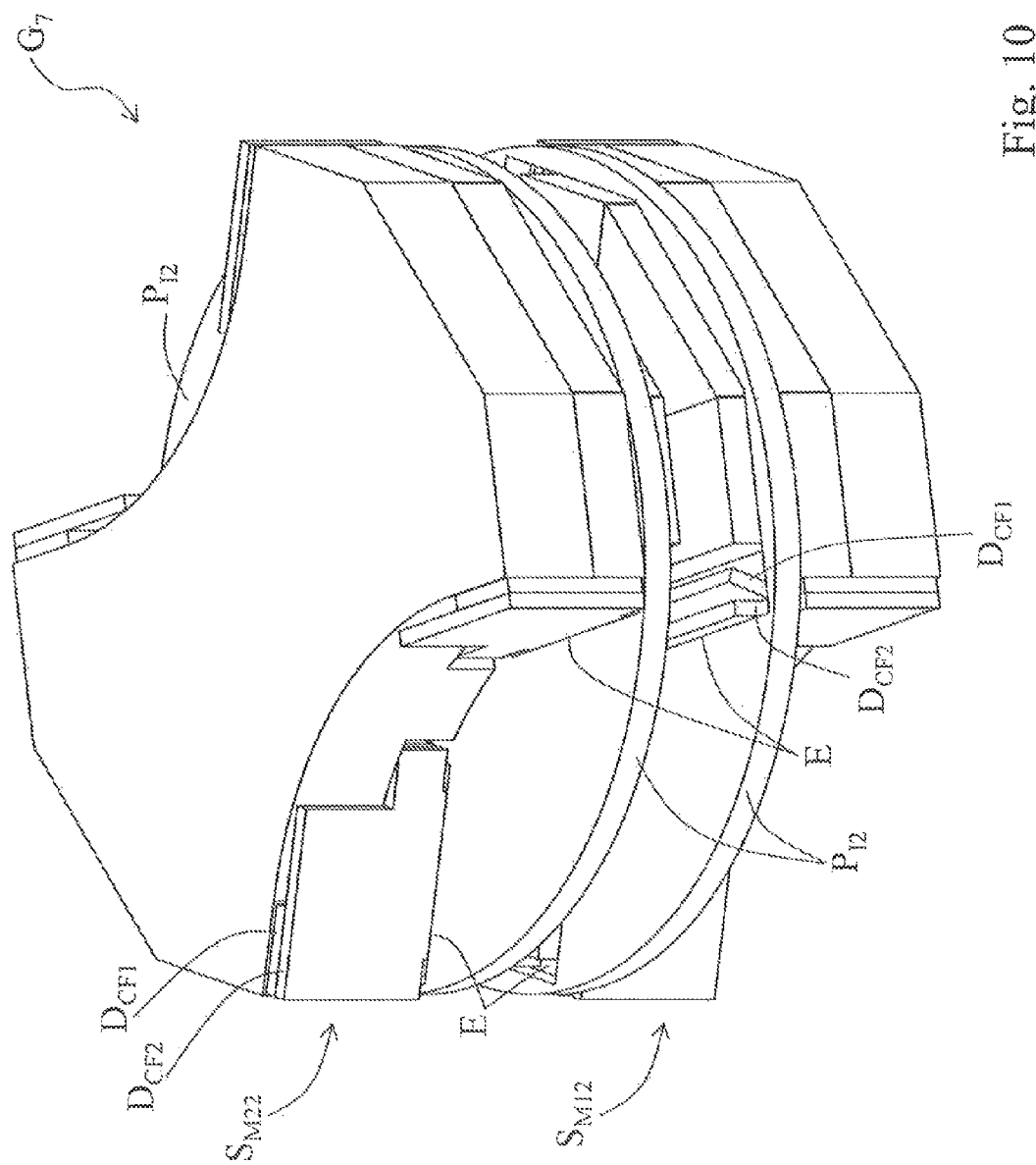
FIG. 10 is a view of the generator of FIG. 8 provided with devices able to contain the magnetic field flux.
Figure 11:
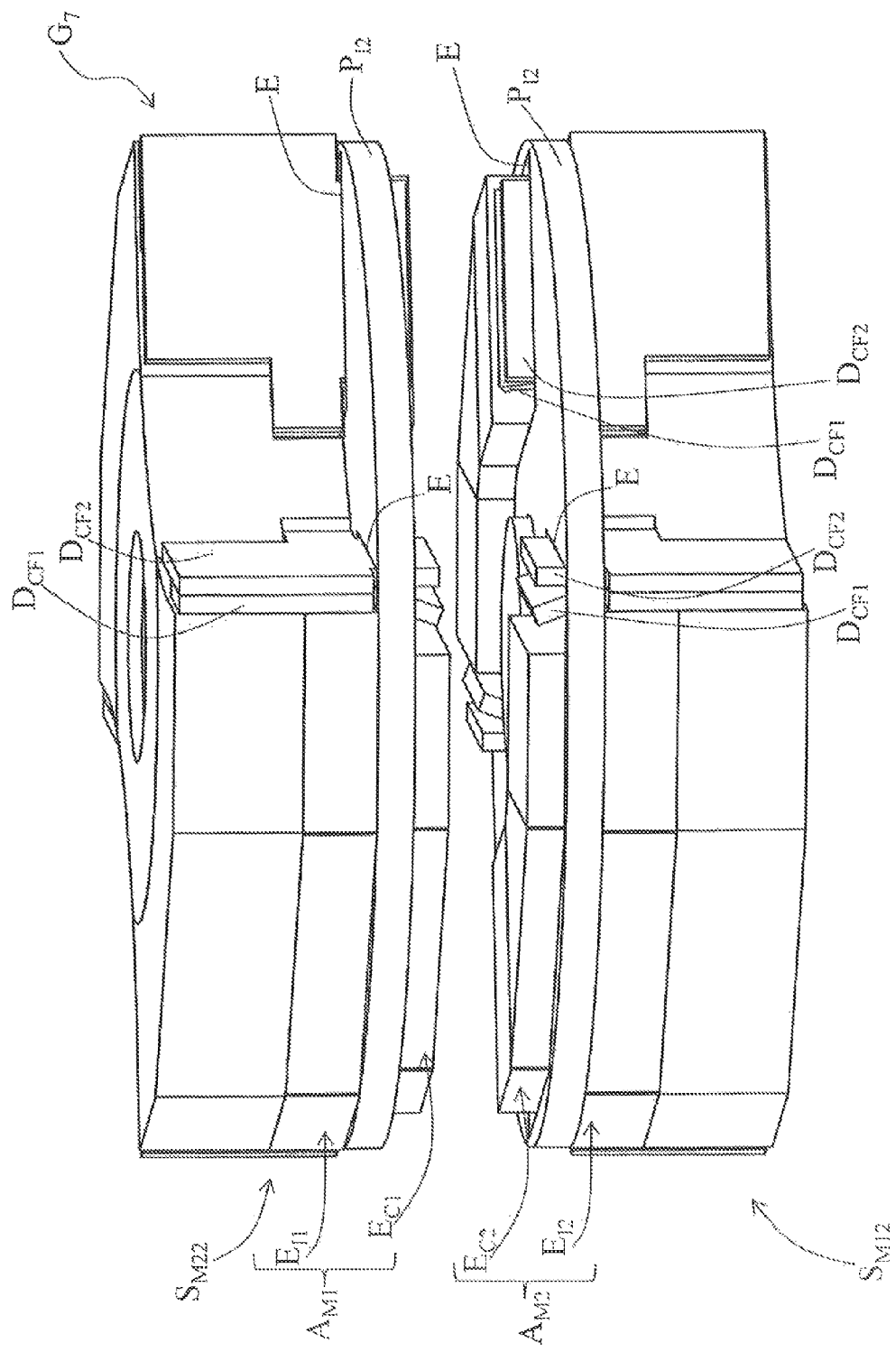
FIG. 11 is a view of the generator of FIG. 10 along a different angle.

It is of course possible to associate the installation of such disks $P_{I1}$ with a generator variant $G_2$, $G_3$, $G_4$, $G_5$ comprising devices $D_{CF1}$, $D_{CF2}$, $D_{CF3}$ arranged to contain the magnetic field flux. To that purpose, FIGS. 10 and 11 represent an embodiment variant in which the magnetic field generator $G_7$ differs from that of FIGS. 8 and 9 by a disk $P_{I2}$ that comprises enlarged recesses E to allow also the passage of the plates $D_{CF1}$, $D_{CF2}$ intended for containing the magnetic flux inside the enclosure of the generator $G_7$.

Figure 12:
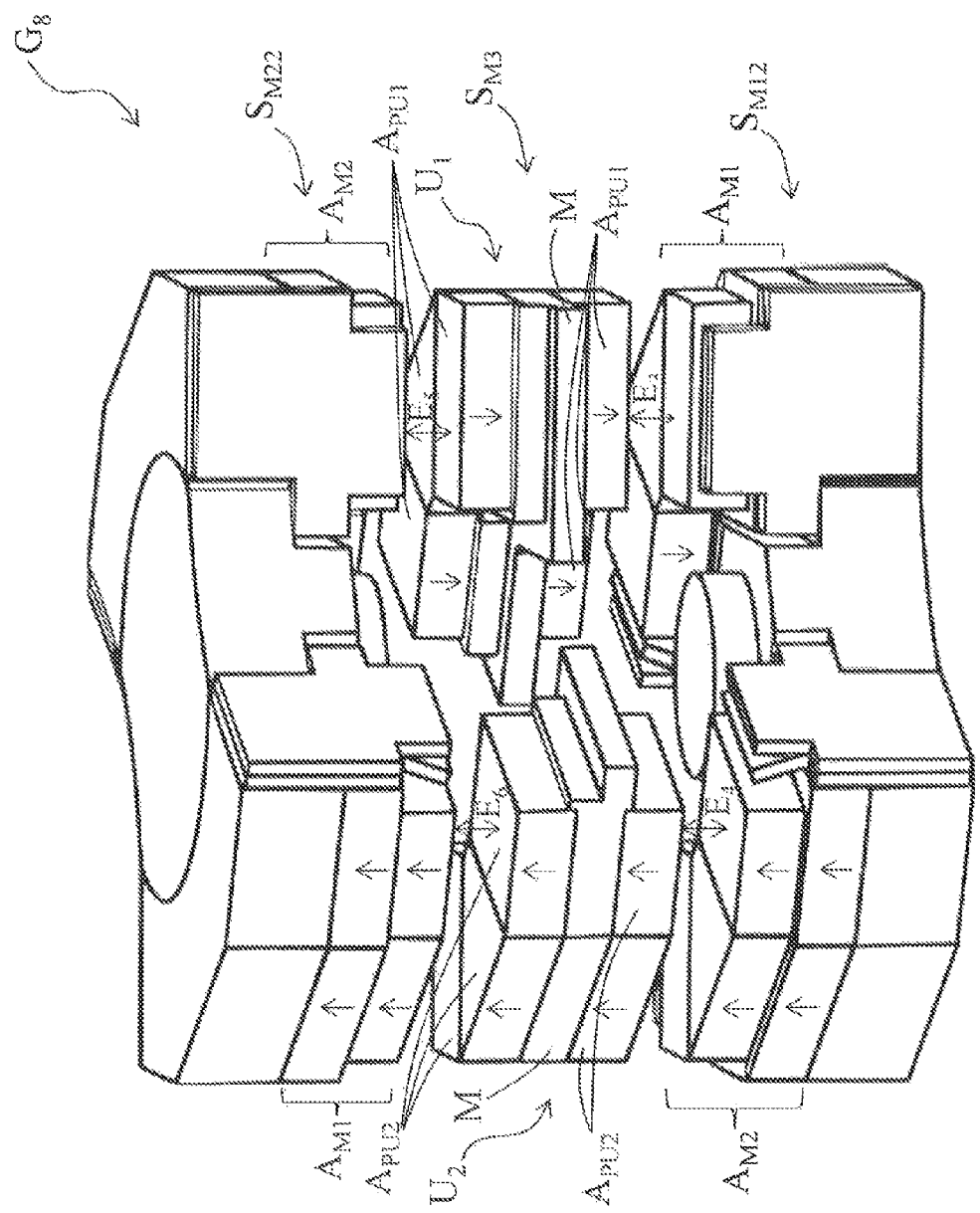
FIG. 12 is a view of another embodiment variant of the magnetic field generator according to the invention.

FIG. 12 represents another embodiment variant in which the magnetic field generator $G_8$ defines four air gaps $E_3$, $E_4$, $E_5$, $E_6$. This generator $G_8$ has the configuration of the generator $G_2$ of FIG. 3 in which a third magnetizing structure $S_{M3}$ is inserted in the central plane P, between the first $S_{M12}$ and the second $S_{M22}$ magnetizing structures, This third magnetizing structure $S_{M3}$ comprises two magnetizing units $U_1$, $U_2$ located respectively between the first $A_{M1}$ and second $A_{M2}$ magnetizing assemblies of said first $S_{M12}$ and second $S_{M22}$ magnetizing structures. This way, a magnetizing unit $U_1$ is located between the first magnetizing assembly $A_{M1}$ of the first magnetizing structure $S_{M12}$ and the second magnetizing assembly $A_{M2}$ of the second magnetizing structure $S_{M22}$ and another magnetizing unit $U_2$ is located between the second magnetizing assembly $A_{M2}$ of the first magnetizing structure $S_{M12}$ and the first magnetizing assembly $A_{M1}$ of the second magnetizing structure $S_{M22}$. The magnetizing units $U_1$, $U_2$ comprise permanent magnets $A_{PU1}$, $A_{PU2}$ arranged on either side of a partly represented supporting element M that can have the shape of a disk in which at least the areas in contact with the permanent magnets $A_{PU1}$, $A_{PU2}$ are out of a ferromagnetic material to allow the magnetic flux to circulate between the two magnetic assemblies $A_{M1}$, $A_{M2}$ located in front of each other. For example, the permanent magnets $A_{PU1}$, $A_{PU2}$ of the magnetizing units $U_1$, $U_2$ can be made of one single permanent magnet or of several permanent magnets. As a variant of the illustrated sandwich structure comprising permanent magnets inserted on either side of the supporting element M, it is possible to provide that each magnetizing unit $U_1$, $U_2$ comprises only one or several permanent magnets, and the latter can be held in the generator $G_8$ for example by a plastic part. Moreover, to allow achieving a continuous magnetic loop with an intense magnetic field, the magnetic induction vector of each of the permanent magnets $A_{PU1}$, $A_{PU2}$ of the magnetizing units $U_1$, $U_2$ has the same orientation and the same direction as the induction vectors of the first and second magnetizing assemblies $A_{M1}$, $A_{M2}$ between which they are arranged.

The generator G8 of FIG. 12 has the advantage of providing four air gaps $E_3$, $E_4$, $E_5$, $E_6$ superposed two by two and diametrically opposed two by two with limited space requirements and a reduced weight. Also in this embodiment, the magnetic field flux circulates in one single magnetic loop and between the magnetizing assemblies $A_{M1}$, $A_{M2}$ and the magnetizing units $U_1$, $U_2$, only through the air gaps $E_3$, $E_4$, $E_5$, $E_6$.

FIGS. 14A to 14E represent embodiment variants of the third magnetizing structure $S_{M31}$, $S_{M32}$, $S_{M33}$, $S_{M34}$, $S_{M35}$. These variants comprise two magnetizing units $U_{131}$, $U_{132}$, $U_{133}$, $U_{134}$, $U_{135}$, $U_{231}$, $U_{232}$, $U_{233}$, $U_{234}$, $U_{235}$ different from that of the third magnetizing structure $S_{M3}$ represented in FIG. 12. They comprise a smaller number of permanent magnets and therefore have the advantage that they can be assembled in an easier and more rapid way, as fewer operations are necessary, while having the same efficiency as the third magnetizing structure $S_{M3}$ represented in FIG. 12.

Said magnetizing units $U_{131}$, $U_{132}$, $U_{133}$, $U_{134}$, $U_{135}$; $U_{231}$, $U_{232}$, $U_{233}$, $U_{234}$, $U_{235}$ are intended for being arranged in a magnetic field generator the same way as the third magnetizing structure $S_{M3}$, that is to say respectively, on the one hand, between the first magnetizing assembly $A_{M1}$ of the first magnetizing structure $S_{M12}$ and the second magnetizing assembly $A_{M2}$ of the second magnetizing structure $S_{M22}$ and, on the other hand, between the second magnetizing assembly $A_{M2}$ of the first magnetizing structure $S_{M12}$ and the first magnetizing assembly $A_{M1}$ of the second magnetizing structure $S_{M22}$.

Figure 14B:
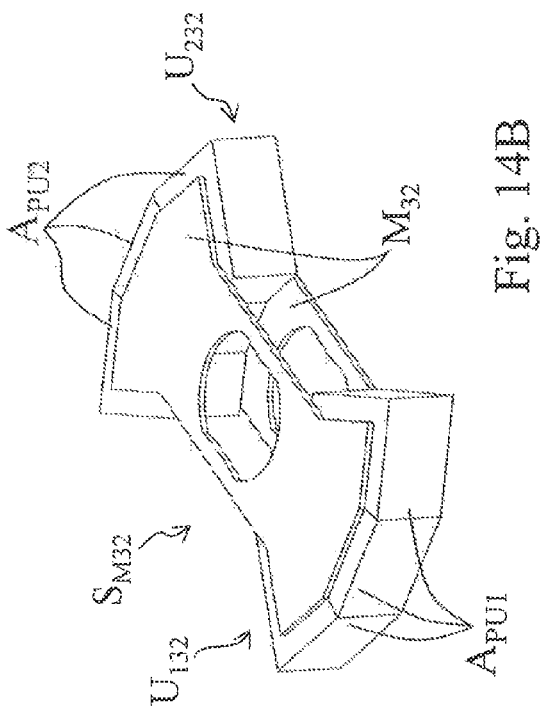
Figure 14A:
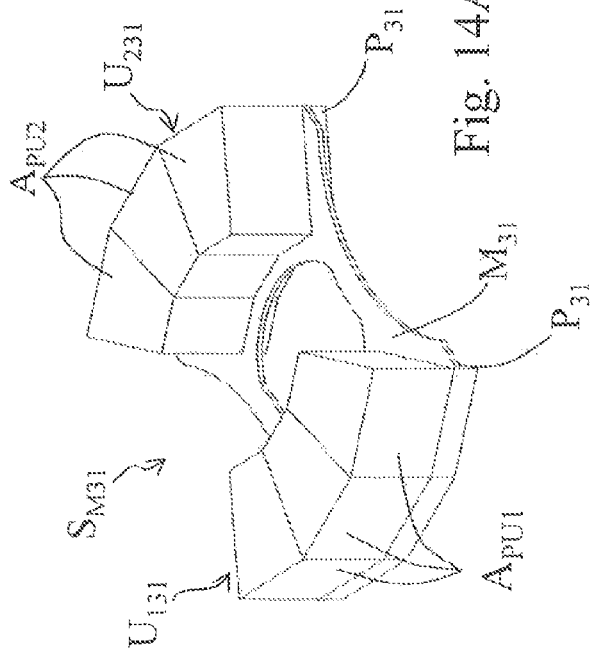

In a first variant of the third magnetizing structure $S_{M31}$ represented in FIG. 14A, the two magnetizing units $U_{131}$, $U_{231}$ comprise permanent magnets $A_{PU1}$, $A_{PU2}$ arranged only on one side of a supporting element $M_{31}$ made out of a ferromagnetic material, The shape of said magnets $A_{PU1}$, $A_{PU2}$ has substantially the same dimensions in the central plane P as the projection in said plane P of the magnets of the first and second magnetizing structure. The supporting element $M_{31}$ has the shape of a plate that extends on either side of the central axis L, substantially with a dovetail shape, and is made out of a ferromagnetic material. The magnets $A_{PU1}$, $A_{PU2}$ are mounted and glued on this supporting element $M_{31}$. Moreover, as represented in FIG. 14A, the plate forming the supporting element $M_{31}$ can comprise on its side opposite to the magnets $A_{PU1}$, $A_{PU2}$ protruding sections such as flat protuberances $P_{31}$, that extend towards the corresponding magnetizing assembly and having, seen in projection on the plane P, the same surface as that of the magnets $A_{PU1}$, $A_{PU2}$. Such protuberances allow increasing the magnetic induction in the air gaps and preventing magnetic saturation in the third magnetizing structure $S_{M31}$.

In the variant represented in FIG. 14B, the third magnetizing structure $S_{M32}$ comprises two identical supporting elements $M_{32}$ mounted on either side of the permanent magnets $A_{PU1}$, $A_{PU2}$. These supporting elements $M_{32}$ do not have protuberances as in the previous example and are made of a plate out of a ferromagnetic material. The permanent magnets $A_{PU1}$, $A_{PU2}$ are preferably glued on at least one of said supporting elements $M_{32}$ and can be glued also on the other supporting element $M_{32}$, or simply positioned on the latter by magnetic attraction. Moreover, thesurface of the plate that forms each supporting element $M_{32}$ can cover only a section of the permanent magnets $A_{PU1}$, $A_{PU2}$, which allows reducing the quantity of material required for its manufacture, and therefore also its cost price, while reducing the weight of the third magnetizing structure $S_{M32}$. Moreover, the supporting element $M_{32}$ can cover only a discontinuous section of the permanent magnets $AP_{U1}$, $AP_{U2}$.

In a third variant represented in FIG. 14C, the third magnetizing structure $S_{M33}$ comprises two identical supporting elements $M_{33}$ mounted on either side of the permanent magnets $A_{PU1}$, $A_{PU2}$. These supporting elements $M_{33}$ do not have protuberances as in the example of FIG. 14A and are made of a plate out of a ferromagnetic material. The permanent magnets $A_{PU1}$, $A_{PU2}$ are preferably glued on at least one of said supporting elements $M_{33}$ and simply positioned on the other supporting element $M_{33}$.

The variant of FIG. 14D represents the configuration of FIG. 14C in which the supporting elements $M_{34}$ of the third magnetizing structure $S_{34}$ have protuberances $P_{34}$ such as those represented in FIG. 14A and showing the same advantages.

The third magnetizing structure $S_{M35}$ realized according to a fifth variant and represented in FIG. 14E differs from that of FIG. 14D by the chamfer or substantially pyramidal shape of the protuberances $P_{36}$ of the supporting elements $M_{35}$. Such a configuration allows promoting the concentration of the magnetic flux in a smaller volume.

The magnetic field generator $G_9$ represented in FIG. 15 illustrates an embodiment variant of the one of FIG. 12 that includes the third magnetizing structure $S_{M32}$ represented in FIG. 14B. In this example, the magnetizing assemblies $A_{M19}$ and $A_{M29}$ comprise only one single stage $E_U$ of permanent magnets $A_{PU}$, with an active side $F_{A1}$, $F_{A2}$ located in the air gaps $E_7$, $E_8$, $E_9$, $E_{10}$. The passive side $F_{P1}$, $F_{P2}$ of a magnetizing assembly $A_{M19}$, $A_{M29}$ corresponds to the side of the magnets $A_{PU}$ of the single stage $E_U$ in contact with the support $S_{UP9}$. The third magnetizing structure $S_{M32}$ allows creating four air gaps in an optimized volume. Compared with the magnetic field generator $G_8$ represented in FIG. 12, this magnetic field generator $G_9$ can be manufactured in a more cost-effective way, as it comprises less parts and, in addition to being lighter and requiring less material, allows a more rapid assembly.

All of the generators $G_1$, $G_2$, $G_3$, $G_4$, $G_4$, $G_5$, $G_6$, $G_7$, $G_8$ represented comprise two stages of permanent magnets, that is to say one initiator stage $E_{I1}$, $E_{I2}$ and one concentrator stage $E_{C1}$, $E_{C2}$. However, the invention is not linked to this number of stages. In effect, according to the magnetic field requirements in the air gaps $E_1$, $E_2$, $E_3$, $E_4$, $E_5$, $E_6$, it is possible to consider integrating more than two stages of permanent magnets in magnetizing assemblies $A_{M1}$, $A_{M2}$, or less, as in the generator $G_9$ illustrated in FIG. 15, which comprises only one stage of permanent magnets $E_U$.

The different embodiment variants illustrated in the figures and described can of course be combined with each other to provide a wide panel of technical combinations, according to the needs.

In a general way, it is easier and more cost-effective to manufacture small-size permanent magnets. In addition, the magnetic field or induction in small-size permanent magnets is more homogeneous than in larger permanent magnets. The stages of permanent magnets $A_{PI}$, $A_{PC}$, $AP_U$ can comprise only one or several juxtaposed permanent magnets. However, as it is technically easier and more cost-effective to manufacture three polyhedral permanent magnets having four sides and to assemble them with each other than to manufacture one single large magnet, this variant with several magnets can be preferred. It is in effect more simple to magnetize small parts, and the magnetic field achieved in these parts is more intense and more homogeneous, which allows, on the one hand, to reduce the manufacturing costs and, on the other hand, to improve the homogeneity and intensity of the magnetic field in the corresponding air gaps $E_1$, $E_2$, $E_3$, $E_4$, $E_5$, $E_6$, $E_7$, $E_8$, $E_9$, $E_{10}$.

The magnetic field generators $G_1$, $G_2$, $G_3$, $G_4$, $G_5$, $G_6$, $G_7$, $G_8$, $G_9$ illustrated by all of the FIGS. 1 to 12 and 15 are intended for being integrated in a thermal device $A_T$ as the one represented schematically in FIG. 13 and comprising at least one magnetocaloric element $E_M$. This magnetocaloric element $E_M$ can be made of one or several magnetocaloric materials and is crossed or in contact with a heat transfer fluid that circulates alternately in two opposite directions according to the position of said magnetocaloric element $E_M$ in and outside an air gap $E_1$, $E_2$, $E_3$, $E_4$, $E_5$, $E_6$, $E_7$, $E_8$, $E_9$, $E_{10}$. The means for circulating the heat transfer fluid are not represented.

The represented magnetic field generators $G_1$, $G_2$, $G_3$, $G_4$, $G_5$, $G_6$, $G_7$, $G_8$, $G_9$ comprise at least two diametrically opposed air gaps $E_1$, $E_2$, $E_3$, $E_4$, $E_5$, $E_6$, $E_7$, $E_8$, $E_9$, $E_{10}$, which also allows subjecting at least two magnetocaloric elements $E_M$ to the magnetic field, and therefore increasing the efficiency of such thermal device $A_T$ including said magnetic field generator $G_1$, $G_2$, $G_3$, $G_4$, $G_5$, $G_6$, $G_7$, $G_8$, $G_9$, while keeping compact and reduced dimensions.

The magnetocaloric element $E_M$ and the magnetic field generator $G_1$, $G_2$, $G_3$, $G_4$, $G_5$, $G_6$, $G_7$, $G_8$, $G_9$ are preferably mounted in a relative movement with respect to each other, so that said magnetocaloric element $E_M$ can alternately enter and exit an air gap $E_1$, $E_2$, $E_3$, $E_4$, $E_5$, $E_6$, $E_7$, $E_8$, $E_9$, $E_{10}$. This position change can be achieved by a continuous or sequential rotation or by a reciprocating rotational movement of the magnetic field generator $G_1$, $G_2$, $G_3$, $G_4$, $G_5$, $G_6$, $G_7$, $G_8$, $G_9$ with respect to said magnetocaloric element $E_M$ or vice-versa, of the disk carrying the magnetocaloric elements $E_M$ with respect to said magnetic field generator.

The invention advantageously allows achieving a high magnetic field of about 1 Tesla in each air gap $E_1$, $E_2$, $E_3$, $E_4$, $E_5$, $E_6$, $E_7$, $E_8$, $E_9$, $E_{10}$ thanks to the use of permanent magnets whose magnetic remanence (magnetic induction) lies between 0.8 and 1.4 Tesla. This is all the more surprising as the air gaps are wide, unlike the narrow air gaps in the known magnetic field generators, and have in particular a height corresponding at least to about one third of the height of one of the stages of permanent magnets.

POSSIBILITIES FOR INDUSTRIAL APPLICATION

This description shows clearly that the invention allows reaching the goals defined, that is to say offer a magnetic field generator whose production is structurally simple, cost-effective, compact, and which allows achieving an intense and uniform magnetic field of about one Tesla in a magnetocaloric thermal device $A_T$ with a rotary configuration. Such magnetic field generator can in particular find an application, as well industrial as domestic, when it is integrated in a magnetocaloric thermal device $A_T$ intended for operation in the area of heating, air conditioning, tempering, cooling or others, at competitive costs and with reduced space requirements.

The present invention is not restricted to the examples of embodiment described, but extends to any modification and variant which is obvious to a person skilled in the art while remaining within the scope of the protection defined in the attached claims.

The invention claimed is:

1. A magnetic field generator ($G_1$, $G_2$, $G_3$, $G_4$, $G_5$, $G_6$, $G_7$, $G_8$, $G_9$) for a magnetocaloric thermal device ($A_T$) with a rotary structure, the magnetic field generator ($G_1$, $G_2$, $G_3$, $G_4$, $G_5$, $G_6$, $G_7$, $G_8$, $G_9$) comprising:
   first ($S_{M11}$, $S_{M12}$, $S_{M13}$, $S_{M14}$, $S_{M15}$, $SM_{19}$) and second ($S_{M21}$, $S_{M22}$, $SM_{29}$) identical magnetizing structures mounted head-to-tail, opposite to each other, parallel on either side of a central plane (P) and arranged to define at least two air gaps ($E_1$, $E_2$, $E_3$, $E_4$, $E_5$, $E_6$, $E_7$, $E_8$, $E_9$, $E_{10}$) located diametrically opposed one another and in a same plane;
   each magnetizing structure ($S_{M11}$, $_{M12}$, $S_{M13}$, $S_{M14}$, $S_{M15}$, $SM_{19}$, $S_{M21}$, $S_{M22}$, $SM_{29}$) comprising first ($A_{M1}$, $A_{M19}$) and second ($A_{M2}$, $A_{M29}$) structurally identical magnetizing assemblies, diametrically opposed, whose induction vectors are oriented in opposite directions, mounted on a support ($S_{UP1}$, $S_{UP2}$, $S_{UP3}$, $S_{UP4}$, $S_{UP9}$) made out of at least one ferromagnetic material and delimiting the air gaps;
   wherein the first ($A_{M1}$, $A_{M19}$) and the second ($A_{M2}$, $A_{M29}$) magnetizing assemblies have each a structure with permanent magnets ($A_{PI}$, $A_{PC}$, $A_{PU}$) whose magnetic induction vectors are substantially perpendicular to the central plane (P) and comprise a passive side ($F_{P1}$, $F_{P2}$) and an active side ($F_{A1}$, $F_{A2}$);
   the active side ($F_{A1}$, $F_{A2}$) delimits the air gaps; and
   the induction vectors of the first ($A_{M1}$, $A_{M19}$) and the second ($A_{M2}$, $A_{M29}$) magnetizing assemblies form, inside of the generator, a single circulation loop of a magnetic field through the supports ($S_{UP1}$, $S_{UP2}$, $S_{UP3}$, $S_{UP4}$, $S_{UP9}$) and the air gaps ($E_1$, $E_2$, $E_3$, $E_4$, $E_5$, $E_6$, $E_7$, $E_8$, $E_9$, $E_{10}$).

2. The magnetic field generator ($G_1$, $G_2$, $G_3$, $G_4$, $G_5$, $G_6$, $G_7$, $G_8$,) according to claim 1, wherein the permanent magnet structure ($A_{PI}$, $A_{PC}$) is a stepped structure which comprises at least two stages ($E_{I1}$, $E_{I2}$, $E_{C1}$, $E_{C2}$) of permanent magnets ($A_{PI}$, $A_{PC}$), the at least two stages ($E_{I1}$, $E_{I2}$, $E_{C1}$, $E_{C2}$) are concentrically superposed and comprise a first stage of permanent magnets called magnetic flux initiator stage ($E_{I1}$, $E_{I2}$) which form the passive side ($F_{P1}$, $F_{P2}$) of the first ($A_{M1}$) and the second ($A_{M2}$) magnetizing assemblies, and a second stage of permanent magnets called magnetic flux concentrator stage ($E_{C1}$, $E_{C2}$) which form the active side ($F_{A1}$, $F_{A2}$) of the first ($A_{M1}$) and the second ($A_{M2}$) magnetizing assemblies delimiting the air gaps.

3. The magnetic field generator according to claim 1, wherein each magnetizing structure ($S_{M12}$, $S_{M13}$, $S_{M14}$, $S_{M15}$, $S_{M22}$) comprises a device ($D_{CF1}$, $D_{CF2}$, $D_{CF3}$) arranged to contain the magnetic field in a volume delimited by the generator ($G_2$, $G_3$, $G_4$, $G_5$, $G_7$).

4. The magnetic field generator according to claim 3, wherein the device arranged to contain the magnetic field comprises at least one plate ($D_{CF1}$, $D_{CF2}$) made out of a ferromagnetic material, located against a corresponding lateral side of the support ($S_{UP1}$, $S_{UP2}$, $S_{UP3}$) and which extends towards the corresponding air gap ($E_1$, $E_2$).

5. The magnetic field generator according to claim 2, wherein a flat thermal insulation part ($P_{I1}$, $P_{I2}$), which extends parallel to the central plane (P), is mounted on every magnetizing structure ($S_{M11}$, $S_{M12}$, $S_{M21}$, $S_{M22}$) and placed on the corresponding concentrator stages ($E_{C1}$, $E_{C2}$).

6. The magnetic field generator according to claim 1, wherein the magnetic field generator comprises a third magnetizing structure ($S_{M3}$, $S_{M31}$, $S_{M32}$, $S_{M33}$, $S_{M34}$, $S_{M35}$) inserted in the central plane (P), between the first ($S_{M12}$, $S_{M19}$) and the second ($S_{M22}$, $S_{M29}$) magnetizing structures, the third magnetizing structure ($S_{M3}$, $S_{M31}$, $S_{M32}$, $S_{M33}$, $S_{M34}$, $S_{M35}$) comprises two magnetizing units ($U_1$, $U_{131}$, $U_{132}$, $U_{133}$, $U_{134}$, $U_{135}$, $U_2$, $U_{231}$, $U_{232}$, $U_{233}$, $U_{234}$, $U_{235}$) respectively located between the first ($A_{M1}$, $A_{M19}$) and the second ($A_{M2}$, $A_{M29}$) magnetizing assemblies of the first ($S_{M12}$, $S_{M19}$) and the second ($S_{M22}$, $S_{M29}$) magnetizing structures for delimiting four air gaps ($E_3$, $E_4$, $E_5$, $E_6$, $E_7$, $E_8$, $E_9$, $E_{10}$).

7. The magnetic field generator according to claim 6, wherein each magnetizing unit ($U_1$, $U_{131}$, $U_{132}$, $U_{133}$, $U_{134}$, $U_{135}$, $U_2$, $U_{231}$, $U_{232}$, $U_{233}$, $U_{234}$, $U_{235}$) comprises at least one permanent magnet ($A_{PU1}$, $A_{PU2}$) whose magnetic induction vector has a same orientation and a same direction as the magnetic induction vector of the magnetizing assemblies ($A_{M1}$, $A_{M2}$) between which the magnetizing unit ($U_1$, $U_{131}$, $U_{132}$, $U_{133}$, $U_{134}$, $U_{135}$, $U_2$, $U_{231}$, $U_{232}$, $U_{233}$, $U_{234}$, $U_{235}$) is positioned.

8. The magnetic field generator according to claim 6, wherein the magnetizing units ($U_1$, $U_2$) comprise permanent magnets ($A_{PU1}$, $A_{PU2}$) arranged on either side of a supporting element (M, $M_{31}$, $M_{32}$, $M_{33}$, $M_{34}$, $M_{35}$) made out of a ferromagnetic material.

9. The magnetic field generator according to claim 6, wherein the magnetizing units ($U_1$, $U_2$) comprise permanent magnets ($A_{PU1}$, $A_{PU2}$) arranged between two identical supporting elements (M, $M_{31}$, $M_{32}$, $M_{33}$, $M_{34}$, $M_{35}$) which extend parallel to one another and are made of a ferromagnetic material.

10. A magnetocaloric thermal device ($A_T$) with a rotary structure, with at least one disk comprising magnetocaloric elements ($E_M$) and at least one magnetic field generator ($G_1$, $G_2$, $G_3$, $G_4$, $G_5$, $G_6$, $G_7$, $G_8$, $G_9$), the generator comprising a first ($S_{M11}$, $S_{M12}$, $S_{M13}$, $S_{M14}$, $S_{M15}$, $SM_{19}$) and a second ($S_{M21}$, $S_{M22}$, $SM_{29}$) identical magnetizing structures mounted head-to-tail, opposite to each other, parallel on either side of a central plane (P) and arranged to define at least two air gaps ($E_1$, $E_2$, $E_3$, $E_4$, $E_5$, $E_6$, $E_7$, $E_8$, $E_9$, $E_{10}$) located in a same plane and diametrically opposed, each magnetizing structure ($S_{M11}$, $S_{M12}$, $S_{M13}$, $S_{M14}$, $S_{M15}$, $SM_{19}$, $S_{M21}$, $S_{22}$, $SM_{29}$) comprising first ($A_{M1}$, $A_{M19}$) and second ($A_{M2}$, $A_{M29}$) structurally identical magnetizing assemblies, diametrically opposed, whose induction vectors are oriented in opposite directions, mounted on a support ($S_{UP1}$, $S_{UP2}$, $S_{UP3}$, $S_{UP4}$, $S_{UP9}$) made out of at least one ferromagnetic material and delimiting the air gaps between which the at least one disk carrying the magnetocaloric elements ($E_M$) is positioned, device wherein the first ($A_{M1}$, $A_{M19}$,) and the second ($A_{M2}$, $A_{M29}$) magnetizing assemblies of each magnetizing structure each have a structure with permanent magnets ($A_{PI}$, $A_{PC}$, $A_{PU}$) whose magnetic induction vectors are substantially perpendicular to the central plane (P) and comprise a passive side ($F_{P1}$, $F_{P2}$) and an active side ($F_{A1}$, $F_{A2}$), the active side delimits the air gaps, and the induction vectors of the first ($A_{M1}$, $A_{M19}$) and the second ($A_{M2}$, $A_{M29}$) magnetizing assemblies form inside of the generator one single circulation loop of a magnetic field through the supports ($S_{UP1}$, $S_{UP2}$, $S_{UP3}$, $S_{UP4}$, $S_{UP9}$) and the air gaps ($E_1$, $E_2$, $E_3$, $E_4$, $E_5$, $E_6$, $E_7$, $E_8$, $E_9$, $E_{10}$).

11. The magnetocaloric thermal device ($A_T$) according to claim 10, wherein the permanent magnet structure ($A_{PI}$, $A_{PC}$) is a stepped structure which comprises at least two stages ($E_{I1}$, $E_{I2}$, $E_{C1}$, $E_{C2}$) of permanent magnets ($A_{PI}$, $A_{PC}$), the stages ($E_{I1}$, $E_{I2}$, $E_{C1}$, $E_{C2}$) are concentrically superposed and comprise a first stage of permanent magnets called magnetic flux initiator stage ($E_{I1}$, $E_{I2}$) forming the passive side ($F_{P1}$, $F_{P2}$) of the first ($A_{M1}$) and the second ($A_{M2}$) magnetizing assemblies, and a second stage of permanent magnets called magnetic flux concentrator stage ($E_{C1}$, $E_{C2}$) forming the active side ($F_{A1}$, $F_{A2}$) of the first ($A_{M1}$) and the second ($A_{M2}$) magnetizing assemblies delimiting the air gaps.

12. The magnetocaloric thermal device ($A_T$) according to claim 10, wherein the magnetic field generator ($G_1$, $G_2$, $G_3$, $G_4$, $G_5$, $G_6$, $G_7$, $G_8$, $G_9$) comprises a third magnetizing structure ($S_{M3}$, $S_{M31}$, $S_{M32}$, $S_{M33}$, $S_{M34}$, $S_{M35}$) inserted in the central plane (P), between the first ($S_{M12}$) and the second ($S_{M22}$) magnetizing structures, the third magnetizing structure ($S_{M3}$, $S_{M31}$, $S_{M32}$, $S_{M33}$, $S_{M34}$, $S_{M35}$) comprises two magnetizing units ($U_1$, $U_{131}$, $U_{132}$, $U_{133}$, $U_{134}$, $U_{135}$, $U_2$, $U_{231}$, $U_{232}$, $U_{233}$, $U_{234}$, $_{235}$) respectively located between the first ($A_{M1}$) and the second ($A_{M2}$) magnetizing assemblies of the first ($S_{M12}$) and second ($S_{M22}$) magnetizing structures, for delimiting four air gaps ($E_3$, $E_4$, $E_5$, $E_6$).

13. The magnetic field generator ($G_1$, $G_2$, $G_3$, $G_4$, $G_5$, $G_6$, $G_7$, $G_8$,) according to claim 1, wherein, in each magnetizing assembly ($A_{M1}$, $A_{M2}$), a cross-section of the permanent magnet stages ($E_{I1}$, $E_{I2}$, $E_{C1}$, $E_{C2}$) arranged along a plane parallel to the central plane (P), decreases from an initiator stage ($E_{I1}$, $E_{I2}$) towards a concentrator stage ($E_{C1}$, $E_{C2}$).

14. The magnetic field generator ($G_1$, $G_2$, $G_3$, $G_4$, $G_5$, $G_6$, $G_7$, $G_8$,) according to claim 1, wherein the permanent magnet stages ($E_{I1}$, $E_{I2}$, $E_{C1}$, $E_{C2}$) have different magnetic induction values.

15. The magnetic field generator ($G_1$, $G_2$, $G_3$, $G_4$, $G_5$, $G_6$, $G_7$, $G_8$) according to claim 1, wherein at least one plate ($D_{CF1}$) of the device, arranged to contain the magnetic flux, has a bent section which is oriented toward a corresponding air gap ($E_1$, $E_2$).

16. The magnetic field generator ($G_1$, $G_2$, $G_3$, $G_4$, $G_5$, $G_6$, $G_7$, $G_8$,) according to claim 13, wherein the device, arranged to contain the magnetic field flux, comprises a part ($D_{CF3}$) of a ferromagnetic material mounted on a support ($S_{UP4}$), the part ($D_{CF3}$) extends between the first ($A_{M1}$) and the second ($A_{M2}$) magnetizing assemblies of a same magnetizing structure, in a plane parallel to the central plane (P), and the part ($D_{CF3}$) comprises protruding areas ($Z_S$) which extend toward the concentrator stages ($E_{C1}$, $E_{C2}$) at a height of one of inlets and outlets of the aft gaps ($E_1$, $E_2$).

17. The magnetic field generator ($G_1$, $G_2$, $G_3$, $G_4$, $G_5$, $G_6$, $G_7$, $G_8$) according to claim 1, wherein each support ($S_{UP3}$) comprises at least one permanent magnet ($A_{I1}$) in a central part positioned between the first ($A_{M1}$) and the second ($A_{M2}$) magnetizing assemblies of a same magnetizing structure, the magnetic induction vector of the permanent magnet ($A_{I1}$) is parallel to the central plane (P), perpendicular to the induction vectors of the first ($A_{M1}$) and the second ($A_{M2}$) magnetizing assemblies and oriented in a circulation direction of the magnetic field.

18. The magnetic field generator ($G_1$, $G_2$, $G_3$, $G_4$, $G_5$, $G_6$, $G_7$, $G_8$) according to claim 1, wherein the central section of every support ($S_{UP2}$), located between the first ($A_{M1}$) and the second ($A_{M2}$) magnetizing assemblies of a same magnetizing structure, is made out of a ferromagnetic material which has a magnetic permeability that is higher than that of the material forming a remainder of the support.

19. The magnetic field generator ($G_1$, $G_2$, $G_3$, $G_4$, $G_5$, $G_6$, $G_7$, $G_8$) according to claim 13, wherein the thermal insulation part ($P_{I1}$, $P_{I2}$) is a disk which comprises recesses (E) for the passage of the permanent magnets ($A_{PC}$) of the concentrator stage ($E_{C1}$, $E_{C2}$) and rests on a landing formed by the magnet stage ($E_{I1}$, $E_{I2}$) on which the concentrator stage ($E_{C1}$, $E_{C2}$) is mounted.

* * * * *